(12) United States Patent
Roa et al.

(10) Patent No.: US 10,535,096 B2
(45) Date of Patent: *Jan. 14, 2020

(54) INTERACTIVE COLLECTION BOOK FOR MOBILE DEVICES

(71) Applicant: Centric Software, Inc., Los Gatos, CA (US)

(72) Inventors: Humberto Roa, Bainbridge Island, WA (US); Chris Groves, Los Gatos, CA (US); Ronald S. Watson, Los Gatos, CA (US); Ravi Rangan, Bothell, WA (US); James Horne, Melrose, MA (US)

(73) Assignee: Centric Software, Inc., Campbell, CA (US)

( * ) Notice: Subject to any disclaimer, the term of this patent is extended or adjusted under 35 U.S.C. 154(b) by 582 days.

This patent is subject to a terminal disclaimer.

(21) Appl. No.: 15/138,095

(22) Filed: Apr. 25, 2016

(65) Prior Publication Data

US 2016/0239884 A1 Aug. 18, 2016

Related U.S. Application Data

(63) Continuation of application No. 13/253,950, filed on Oct. 5, 2011, now Pat. No. 9,324,107.

(60) Provisional application No. 61/390,171, filed on Oct. 5, 2010.

(51) Int. Cl.
*G06Q 30/00* (2012.01)
*G06Q 30/06* (2012.01)
(Continued)

(52) U.S. Cl.
CPC ....... *G06Q 30/0643* (2013.01); *G06F 3/0482* (2013.01); *G06F 3/04842* (2013.01);
(Continued)

(58) Field of Classification Search
CPC .............. G06Q 30/0643; G06Q 30/02; G06Q 30/0603; G06Q 30/0623; H04W 4/50; H04W 4/80; G06F 3/0482; G06F 3/04842; G06F 3/04847; G06F 3/04883; G06F 2203/04803; H04L 67/34; H04B 5/0031

See application file for complete search history.

(56) References Cited

U.S. PATENT DOCUMENTS 6,631,365 B1 * 10/2003 Neal .................. G06F 16/313
707/690
7,149,665 B2 12/2006 Feld et al.
(Continued)

FOREIGN PATENT DOCUMENTS

KR 10-2005-0087764 A 8/2005

OTHER PUBLICATIONS

Novotny, A., David, L. and Csafor, H., 2015. "Applying RFID technology in the retail industry—benefits and concerns from the consumer's perspective." Amfiteatru Economic, 17(39), pp. 615-631.

*Primary Examiner* — Naeem U Haq
(74) *Attorney, Agent, or Firm* — Aka Chan LLP

(57) ABSTRACT

A software-based interactive collection book for mobile devices provides the users a way to connect their customers to products while the products are still being developed. This will allow a user to engage with their customers earlier to drive more sales. This will result in their products being more successful in the market at the time of launch.

21 Claims, 30 Drawing Sheets

(51) Int. Cl.
*H04W 4/50* (2018.01)
*H04W 4/80* (2018.01)
*G06F 3/0482* (2013.01)
*G06F 3/0484* (2013.01)
*G06F 3/0488* (2013.01)
*H04B 5/00* (2006.01)
*H04L 29/08* (2006.01)

(52) U.S. Cl.
CPC ...... *G06F 3/04847* (2013.01); *G06F 3/04883* (2013.01); *G06Q 30/0603* (2013.01); *G06Q 30/0623* (2013.01); *H04B 5/0031* (2013.01); *H04L 67/34* (2013.01); *H04W 4/50* (2018.02); *H04W 4/80* (2018.02); *G06F 2203/04803* (2013.01)

(56) References Cited

U.S. PATENT DOCUMENTS

| | | | |
|---|---|---|---|
| 7,398,133 B2 * | 7/2008 | Wannier | G06Q 30/0601 700/130 |
| 7,962,369 B2 | 6/2011 | Rosenberg | |
| 7,979,462 B2 | 7/2011 | Chang et al. | |
| 8,494,908 B2 | 7/2013 | Herwig et al. | |
| 8,630,908 B2 | 1/2014 | Forster | |
| 8,674,989 B1 * | 3/2014 | Dalal | G06T 15/50 345/419 |
| 8,833,652 B2 | 9/2014 | Rasband | |
| 2003/0093323 A1 | 5/2003 | Kenyon | |
| 2004/0230494 A1 * | 11/2004 | Lotvin | G06Q 20/02 705/26.4 |
| 2006/0282334 A1 | 12/2006 | Kao | |
| 2008/0248781 A1 | 10/2008 | Cedo Perpinya | |
| 2009/0143104 A1 | 6/2009 | Loh | |
| 2009/0157479 A1 | 6/2009 | Caldwell | |
| 2010/0030663 A1 * | 2/2010 | Wannier | G06Q 10/043 705/26.1 |
| 2010/0094729 A1 * | 4/2010 | Gray | G06O 30/06 705/26.1 |
| 2010/0191578 A1 | 7/2010 | Tran et al. | |
| 2012/0173351 A1 | 7/2012 | Hanson | |
| 2013/0048721 A1 | 2/2013 | Rasband | |
| 2014/0040041 A1 | 2/2014 | Ohnemus | |
| 2014/0358738 A1 | 12/2014 | Ohnemus | |

* cited by examiner

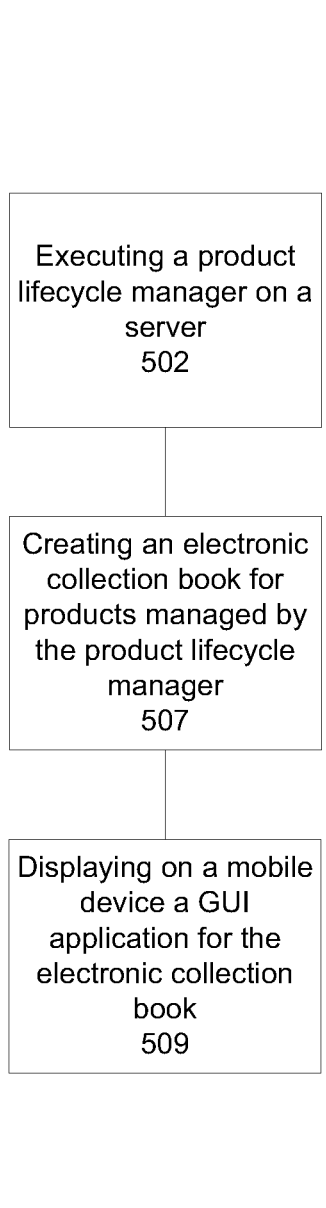
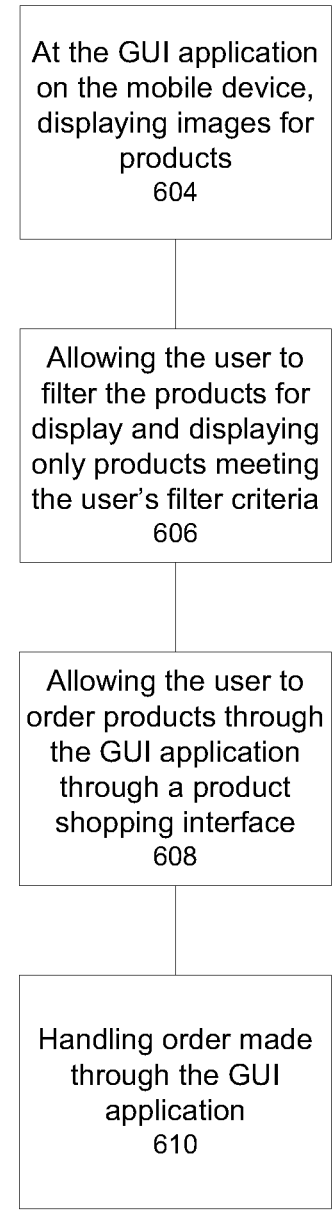
Figure 5
Figure 6

| | Women's Outdoor 2011 Collection All Categories | Logo |
|---|---|---|

Shopping Cart

Product: Women's Outdoor Dress  Code: 100100    Color: Incense    Code: 008

| 38 | 40 | 42 | 44 | 46 | 48 | 50 | 52 | Quantity | Price | Subtotal |
|---|---|---|---|---|---|---|---|---|---|---|
| 5 | 5 | 10 | 10 | 10 | 0 | 0 | 0 | 40 | 60.00 | 2400.00 |

Product: Cargo Pants  Code: 200567        Color: Dust    Code: 052

| 38 | 40 | 42 | 44 | 46 | 48 | 50 | 52 | Quantity | Price | Subtotal |
|---|---|---|---|---|---|---|---|---|---|---|
| 5 | 5 | 10 | 10 | 10 | 0 | 0 | 0 | 40 | 40.00 | 1600.00 |

Product: Sun Hat  Code: 234765        Color: Dust    Code: 052

| S | M | L | | | | | | Quantity | Price | Subtotal |
|---|---|---|---|---|---|---|---|---|---|---|
| 5 | 5 | 5 | | | | | | 15 | 10.00 | 150.00 |

Quantity: 95                Total: 4150.00

Collections  Products  Favorites  Preferences  Cart (95)  Discussions 3603
3601

Figure 36

| | Women's Outdoor 2011 Collection All Categories | Logo |

Style: 100100 — 3705
Women's Outdoors Dress

Humberto Roa - 09/29/2011 — 3707
Is this style available in color: 769?
reply

Pam Smith - 09/29/2011 — 3709
Not for the 2011 season. We might consider it for 2012.
reply John Jones - 09/30/2011
What is the composition of the lining?
reply Phil Miller - 09/30/2011
Likes this style. 👍
reply

3711

Style: 456123
Cargo Pants

3701

Collections | Products | Favorites | Preferences | Cart (95) | Discussions

Figure 37

INTERACTIVE COLLECTION BOOK FOR MOBILE DEVICES

CROSS-REFERENCE TO RELATED APPLICATIONS

This patent application is a continuation of U.S. patent application Ser. No. 13/253,950, filed Oct. 5, 2011, issued as U.S. Pat. No. 9,324,107 on Apr. 26, 2016, which claims the benefit of U.S. patent application 61/390,171, filed Oct. 5, 2010, which are incorporated by reference along with all references cited in this application.

BACKGROUND OF THE INVENTION

This invention relates to the field of software and more specifically to software for the fashion industry.

In the fashion industry, paper-based collection books are being used. A collection book provides the details of products in a printed format. This is the typical way product information is shared with customers before products have been manufactured. Product information is manually pulled from multiple source information systems, and is manually formatted to fit within the limits of a printed page.

There are three major shortcomings with paper-based collection books. First, the information presented in the collection books is manually aggregated from multiple source systems, and it is hard to update these collection books as products change in the source systems. Errors are common, and customers are not happy when their order is cancelled or modified because the information available in the collection book was incorrect or incomplete at the time the order was placed.

Second, the information that can be displayed is limited by the physical space available on a page. Collection books end up with a large amount of product information cross referenced with cryptic codes. For example, on one page the customer can see a product image, with codes for the colors, options, and materials the product is offered in under the image. The customer must then go to separate page to look up the details for the codes to understand how to configure the product.

Third, types of media that are shown to buyers is limited to those that can be printed. Companies cannot conveniently offer the buyer videos and three-dimensional models in printed format.

Therefore, there is a need for improvements to the paper-based collection books process. Replacing paper-based collection books with electronic collection books will stimulate sales of the products, especially when the products are presented at live events.

BRIEF SUMMARY OF THE INVENTION

A software-based interactive collection book for mobile devices provides producers of fashion items (e.g., fashion houses, designers, or others) to connect with their customers. This can be done early in the product lifecycle at the development stage. This will allow these producers to engage with their customers early and often with their ideas to drive more sales and receive feedback on their ideas. This will result in their products being more successful in the market when they are launched.

An interactive collection book for mobile devices allows a user to browse products, provide feedback, support decision making, negotiating, and make purchases on a mobile device. These functions can be geographically limited. Some locations can include fashion shows, focus groups, trade shows, boutiques, and show rooms. Products can include product prototypes that have not been committed to be manufactured, but may be manufactured if there is enough interest from potential buyers. Feedback can include suggestions to improve the product, interest in buying the product, and special requests for changes to the product as a condition to purchase. Purchases can include pre-ordering the product.

One of the benefits the system has over paper-based collection books are that the information presented in an interactive collection book for mobile devices is automatically aggregated from multiple information systems, and is automatically updated as the product information changes in the source systems (e.g., system maintained by a fashion house or designer). Another benefit is that information is not limited by physical space. User can access the information through multiple levels of detail to go from a brief summary to detailed explanations as needed. Also, the user can pan and zoom photos and other objects to observe details at different levels of zoom. Yet another benefit is that the choices of media that can be used is greater. The media that is present to buyers is limited to media that can be displayed on a mobile device, and as mobile device technology improves, the list of media types will increase. For example, this allows product information to be shared in formats that cannot be printed like videos and three-dimensional (3D) models. These models and videos can be opened natively (e.g., without needing to open another software) or through other software on the mobile device.

An advantage of the system over e-commerce systems is that information presented in an interactive collection book for mobile devices is automatically aggregated from multiple information systems, and is automatically updated as the product information changes in the source systems. Another benefit is that an interactive collection book for mobile devices understands the location of the user, and can use this information to filter products that are displayed or to change the product attribute values based on the users' location.

An advantage of the system over enterprise resource planning systems is that information presented in an interactive collection book for mobile devices can include products that have not been committed to be manufactured. Another advantage is that the user interface of an interactive collection book for mobile devices is designed to be used by nonspecialists. Any buyer can use an interactive collection book for mobile devices to browse products, submit feedback, and place orders without first needing to be trained on how to use the software.

An advantage of the system over information system that specialize in product development processes is that the user interface of an interactive collection book for mobile devices is designed to be used by nonspecialists. Any buyer can use an interactive collection book for mobile devices to browse products, submit feedback, and place orders. Also, a buyer can directly place orders in an interactive collection book for mobile devices. Yet another advantage is that an interactive collection book for mobile devices aggregates information from multiple systems, including information systems that specialize in product development processes, inventory management systems, and price book management systems. An interactive collection book for mobile devices is able to provide more information about products than information systems that specialize in product development processes, including prices, photos, and units in inventory.

In an implementation, a method includes: for a collection book application, presenting to a user at an electronic tablet device a login screen; presenting to the user a number of pictures representative of a number of collections of products; receiving a first selection from the user via a touch screen interface of the electronic tablet device for one of the collections; based on the first selection, presenting to the user a number of clothing products within the first selection of the collections; providing a user-configurable filter that allows displaying of clothing products meeting a user's selected criteria; providing an ordering screen that allows the user to place orders on one of more selected clothing products; and handling delivering the user's order to a site of the manufacturer of the clothing products.

In various implementations, an order screen for a selected product can be presented to the user at the electronic tablet device. For each product, by product code, the user is allowed to specify a quantity for a number of sizes of the product. A total quantity ordered and subtotal amount is displayed for the user.

The method can include: at a server, executing a product lifecycle management software application including products being displayed through the collection book application executing at the electronic tablet device; allowing changes to be made at the product lifecycle management software application to a products; and delivering the changes in real time to the collection book application executing at the electronic tablet device.

The electronic tablet device can receive a wireless signal indicating a product in a physical proximity to the electronic tablet device. Based on the wireless signal indication, information is received on the electronic tablet device for the product in a physical proximity to the electronic tablet device.

At the electronic tablet device, an ordering page is presented for the product in a physical proximity to the electronic tablet device. In an application, the collection book application is an electronic collection book for a fashion show. The collections of products are for apparel products. On the ordering screen for a product, colors of the products, sizes of the product, and inventory quantity (any one of these or in any combination) are displayed.

A product information screen is displayed for a product selected by the user. For the product selected, the user is allowed to select and view a video on the product. For the product selected, the user is allowed to select and view a images of the product.

In an implementation, a method of organizing an electronic collection book includes: in a first level of hierarchy, organizing products in a number of product collections in the electronic collection book and allowing a user to select one collection from the collections, where the product collections are for apparel; in a second level of hierarchy, organizing products for each of the product collections; in a third level of the hierarchy, organizing each of the products by an attribute; and allowing access to the levels of hierarchy via a graphical user interface of an electronic tablet device.

An attribute can be at least one of whole price, color, size, or inventory quantity, or any combination. The method includes n a fourth level of the hierarchy, organizing for each product a feedback. The feedback includes at least one of comment, vote, or question, or any combination.

The method can further include in a fourth level of the hierarchy, organizing for each product a product list. The product list can include at least one of a shopping cart, favorites, or wish list, or any combination.

The method can further include in a fourth level of the hierarchy, organizing for each collection configuration options including at least one of availability dates, locales, language, or access control, or any combination.

The first level of hierarchy is above the second level of hierarchy. The second level of hierarchy is above the third level of hierarchy.

In an implementation, a method includes: providing a mobile device and a user of the mobile device, where the mobile device contains at least one collection book associated with at least one designer and at least one collection with at least one item; providing a good and an electronically identifiable tag which uniquely identifies a model number of the good; detecting at the mobile device the electronically identifiable tag, where the detecting at the mobile device occurs automatically when the good is within a certain distance of the mobile device; displaying a first screen on the mobile device information on the good, where the information on the good includes metadata; and displaying a second screen on the mobile device information on the good, where the second screen contains at least one piece of information more than the first screen.

The method can further includes displaying a third screen on the mobile device a shopping cart. The mobile device can detect the electronically identifiable tag wirelessly.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 5 shows a sample flow of the system.

FIG. 6 shows a flow of the GUI on a mobile device.

FIG. 11 shows types of product lists that a product can be added to.

FIG. 18 shows types of roles a user can be associated with.

FIG. 36 shows a cart tab of the system.

FIG. 37 shows a "Discussions" tab of the system.

DETAILED DESCRIPTION OF THE INVENTION

Companies that create products will often provide access to new products before the product is mass-produced in order to understand market interest in the product. These companies will produce product prototypes, and present these prototypes at live events to prospective buyers. The buyers can include consumer buyers who intend to purchase one unit of the product and corporate buyers who intent intend to purchase many units of the product in order to resell the product through their sales channels.

After the product is presented to buyers, buyers can communicate interest in buying the product in many ways, including providing suggestions on changes and placing orders. An order can include pre-order for the product, where the buyer is committing to buy a product that is not yet produced. Sometimes the buyer will make a special request for a change to the product as a condition to the purchase. For example, a buyer from Nieman Marcus may request a special color for the product that will only be available at Nieman Marcus stores. The selling company will then determine if the product should be manufactured based on the interest from the buyers and orders that were placed.

To help buyers understand a product when a prototype is presented, companies will produce sales or marketing collateral that describes the attributes of the product. Product attributes can include the colors, materials, and sizes the product will be available in. Also, product attributes can include pictures of the product, the product price, price discounts, minimum order quantity, and product availability date.

This product sales collateral for the fashion industry is often referred to as a collection book. Collection books will contain the products that are presented at the event, and are typically produced in paper format. Companies will provide the collection books to buyers at live events.

Figure 1:
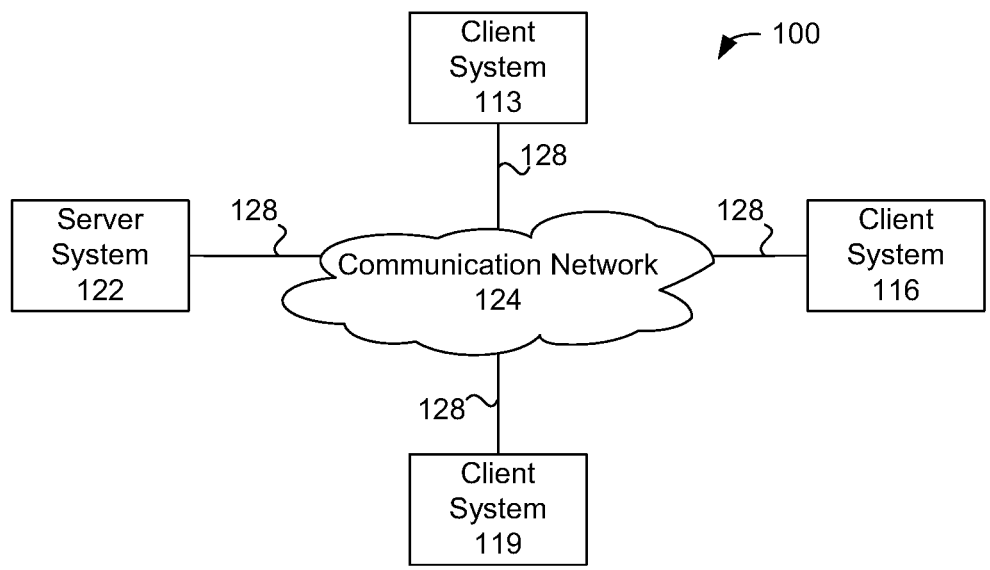
FIG. 1 shows a simplified block diagram of an electronic collection book system for the fashion industry implemented in a distributed computing network connecting a server and clients.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program provided by Microsoft Corporation, and the Firefox browser provided by Mozilla, and others.

Figure 2:
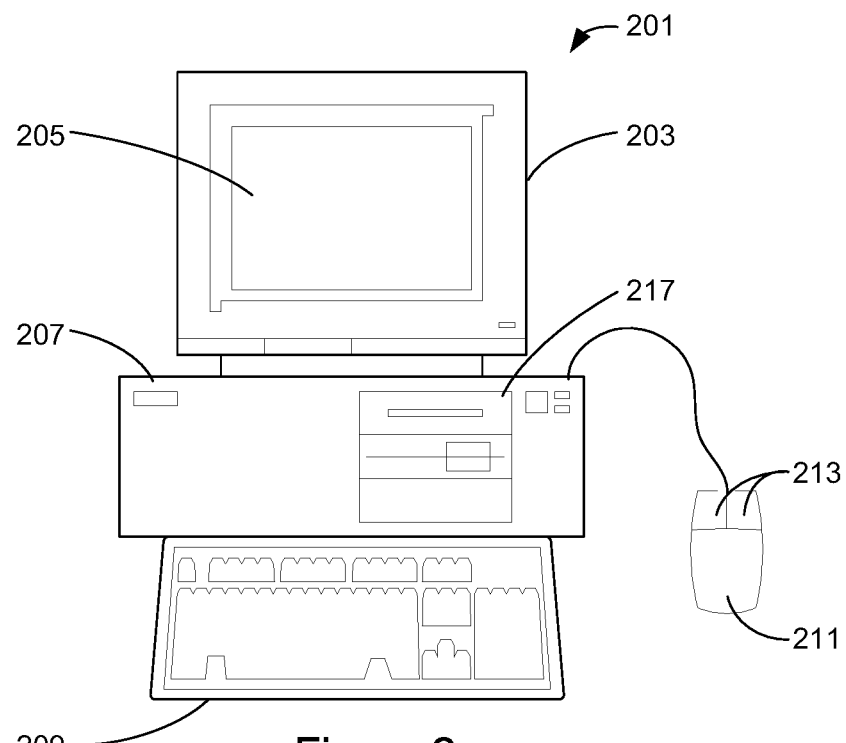
FIG. 2 shows a more detailed diagram of an exemplary client of the electronic collection book system.

FIG. 2 shows an exemplary client system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

The computer system in FIG. 2 is representative of electronic computing systems with a computer processor or central processing unit (CPU). These include servers, desktop computers, workstations, notebook or laptop computers, tablets, nettops, netbooks, smartphones, set-top boxes, media players, and many others. These can also include iPads, iPhones, PDAs, or Android phones.

Figure 3:
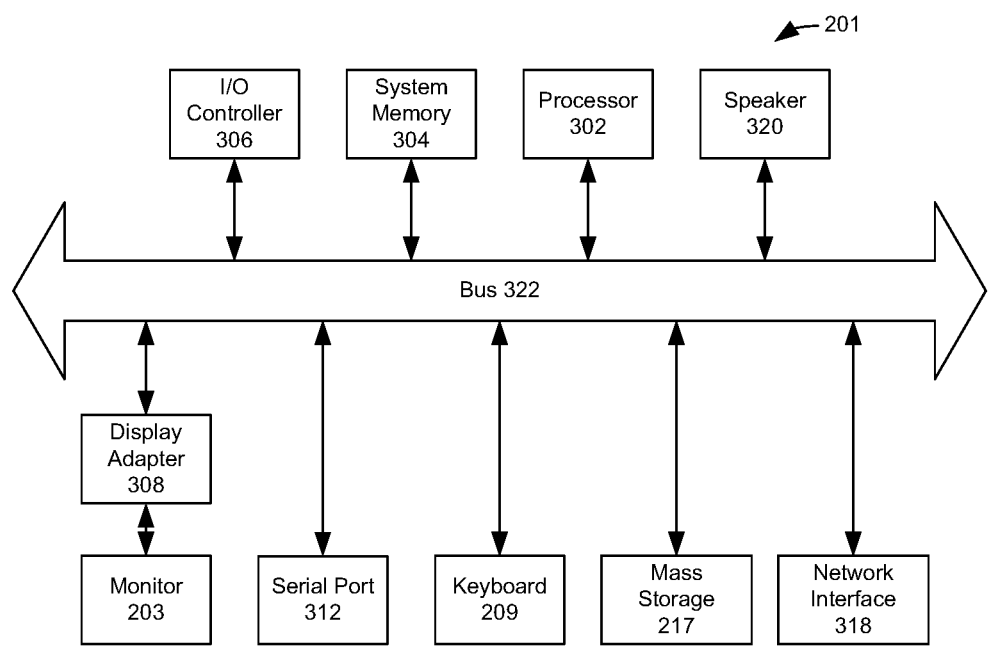
FIG. 3 shows a system block diagram of a client computer system used to execute an electronic collection book application program.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, Microsoft Xbox 360 central processing unit (CPU), and ARM architecture based processors (e.g., Nvida Tegra2, Qualcomm Snapdragon, Apple A4).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). An operating system for the system may be one of the Microsoft Windows® family of operating systems (e.g., Windows 95, 98, Me, Windows NT, Windows 2000, Windows XP, Windows Vista, Windows 7, Windows 8, Windows CE), Linux, UNIX, Sun OS, Ubuntu, or Macintosh OS X. Microsoft Windows is a trademark of Microsoft Corporation. Some mobile operating systems that can be used with an implementation of the invention include: Google Android, Chrome OS; Apple iOS4 or iOS5; Blackberry OS; Windows Phone 7.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

E-commerce systems provide the details of products in a collection to customers for the purpose of browsing products and placing orders. This is a way to present product information to consumer level customers after the products have been manufactured. There are two main issues with these systems. First, setting up products for sale in these systems is cumbersome, and keeping the product information in sync with the information systems used by the product development teams as the products evolve is very difficult. This can work for some like merchants since they assume product information will not change after the product is entered into the e-commerce system. However, companies that are presenting products to customers while the products are still in development face difficulties when using e-commerce systems. Since their products are not finalized, information on their products must be continuously updated from the design management system as the products evolve. Second, these systems do not have an understanding of where the user is. The product selection and product attributes cannot be adjusted based on the user's location.

Enterprise resource planning systems (ERP) provide the details of products that have been released to manufacturing for the purpose of recording sales commitments. This is the typical way to present product information to corporate level customers. There are two main issues with these systems. First, product information is not entered into ERP systems until the products have been committed to be manufactured. For products being developed and products before committed to manufacturing, the product information is primarily managed in separate information systems that specialize in product development processes. Companies prefer to present the product information to customers paper based collection books while the products are being developed to avoid setting up products in an ERP system that may never be manufactured. Second, the user interfaces for ERP systems are difficult to use, and require special training. Customers are typically not allowed to directly interact with an ERP system to browse products and place orders. Instead, the customer's order information must be passed to an ERP specialist to be recorded and updated for fulfillment.

Information system that specializes in product development processes can manage the details of products while the products are in development. There are three main issues with these systems. First, the user interfaces are very difficult to use, and require special training. Customers are typically not allowed to directly interact with these systems to browse products. Instead, the information from the PLM systems are exported and included in paper based collection books to share with a customer. Second, these systems do not have functionality to place orders. These systems only manage information related to the development of the product. Third, the information available in these systems is limited to the information that is needed by the product development teams. Information that is important for placing orders like price, photos, and units in inventory is typically not available in these systems.

In a specific implementation, the interactive collection book is software that executes on a computer. The computer can be a mobile device such as a smartphone (e.g., Apple iPhone, Google Android phones, and similar devices), personal digital assistant (PDA), notebook or laptop computer, or electronic tablet (e.g., Apple iPad, Dell Streak, HP TouchSmart, HP TouchPad, Toshiba Portege, Fujitsu Lifebook, Lenovo IdeaPad, Toshiba Libretto, Amazon Kindle, Sony Reader, Barnes & Noble Nook, Microsoft Courier, and similar devices).

Centric Software, Inc. provides software tools (http://www.centricsoftware.com) which can be used, included, or incorporated with software of the invention. These products including their on-line and off-line documentation, datasheets, user guides, software code, help screens, white papers, application notes, training videos, Web site links and documentation, are incorporated by reference (to filing date of this patent application). All issued and published patent applications of Centric Software, Inc. are also incorporated by reference.

U.S. Pat. No. 7,012,602, issued Mar. 14, 2006, entitled "Virtual Three-Dimensional Display for Product Development" describes a software product that can be used by product development teams to access development information is an easy to use user interface. Embodiments of the invention described in this application can include features such as described in the '602 patent. U.S. Pat. No. 7,012,602 is incorporated by reference.

Figure 4:
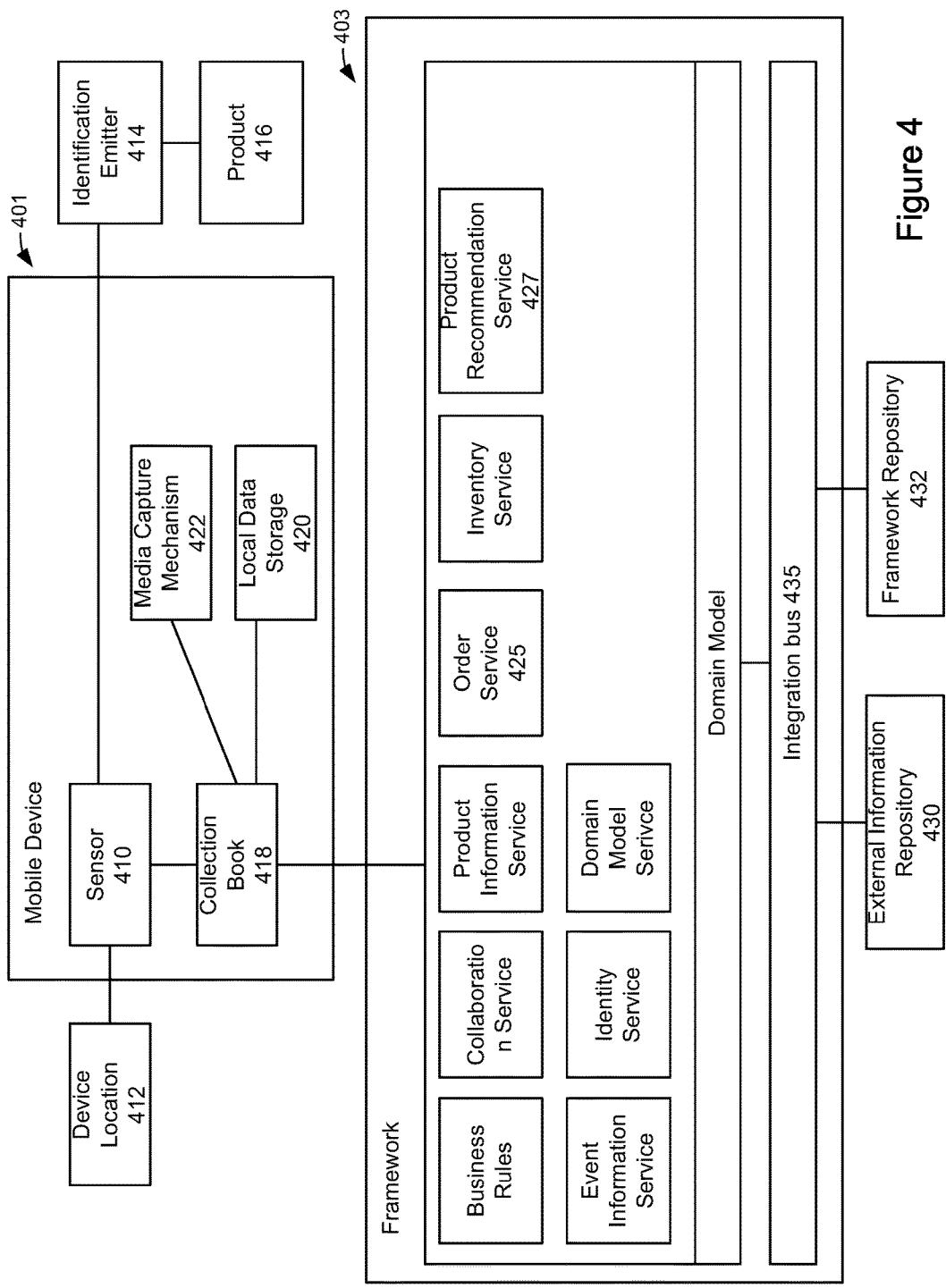
FIG. 4 shows a system diagram of an implementation of an electronic collection book.

FIG. 4 shows a system diagram of an implementation of an electronic collection book. There is a mobile device component 401 and a framework component 403. The mobile device has a sensor 410. The sensor is used to gather information on the mobile device, such as the device's location 412 and identification information 414 of a specific product. The device's location can be determined by using GPS, A-GPS, Wi-Fi hotspots located nearby, or other methods.

In an implementation, the identification information of the product is a bar code. The mobile device has a camera that can capture the bar code. In another implementation, the identification information is a near field communication (NFC) or radio-frequency identification (RFID) sensor. A product can have an embedded NFC tag that the mobile device can identify with the sensor. The mobile device has a copy of the collection book stored 418 in a local data store 420. The mobile device also has access to a media capture mechanism 422. This can be used to capture sounds, images, or text to facilitate purchasing of products.

Framework component 403 contains multiple components of the system that create, maintain, and update the collection book 418 and provide related services to the mobile device. For example, order service 425 allows a user of the mobile device to place orders for products. Product recommendation service 427 allows the system to generate suggestions for products or options that a user may be interested in, based on the user's viewing or purchasing history. For example, if the user has shown an interest in dresses in the Summer 2011 collection, the product recommendation service will show suggestions to the user when dresses are released as part of the Summer 2012 collection. The framework also works with an external information repository 430 and a framework repository 432. An external information repository can be an information system that specializes in product development processes owned and managed by a fashion house, separately from the system. These two repositories can be accessed by the system through the integration bus 435. The framework can be hosted on a server, separate from the mobile device.

Some specific flows of the invention are presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application.

FIG. 5 shows a sample flow of the system. In a first step 502, the system executes a product lifecycle manager on a server. This can be a product lifecycle manager under the control of the system, or separate from the system. In a step 507, the system creates an electronic collection book for products managed by the product lifecycle manager. In a step 509, the system displays on a mobile device a GUI application for the electronic collection book.

FIG. 6 shows a flow of the GUI on a mobile device. In a step 604, at the GUI application on the mobile device, the system displays images for products. In a step 606, the system allows the user to filter the products for display and displaying only products meeting the user's filter criteria. In a step 608, the system allows the user to order products through the GUI application through a product shopping interface. In a step 610, the system handles orders made through the GUI application.

Figure 7:
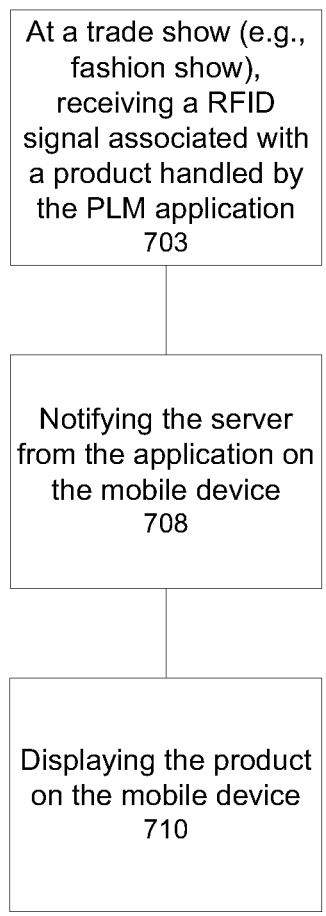
FIG. 7 shows a flow of the system at a trade show.

FIG. 7 shows a flow of the system at a trade show. In a step 703, at a trade show (e.g., fashion show), the system receives a RFID signal associated with a product handled by the PLM application. In a step 708, the system notifies the server from the application on the mobile device. In a step 710, the system displays the product on the mobile device.

Figure 8:
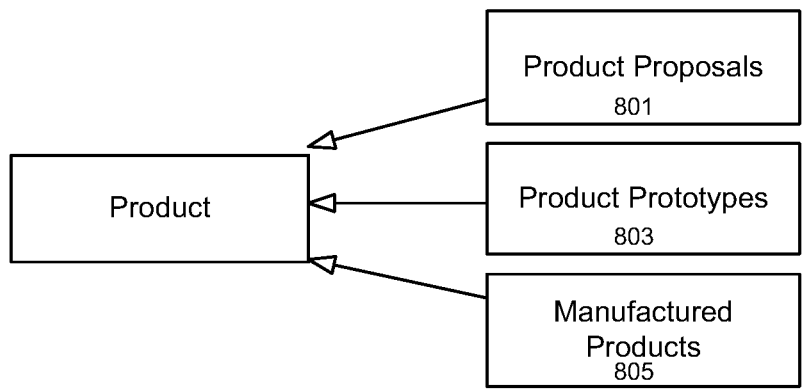
FIG. 8 shows types of products that are tracked by the system.

FIG. 8 shows types of products that are tracked by the system. These products can be at various stages of a product lifecycle. From product proposals 801 to product prototypes 803 to manufactured products 805, the system can include these in a collection book.

Figure 9:
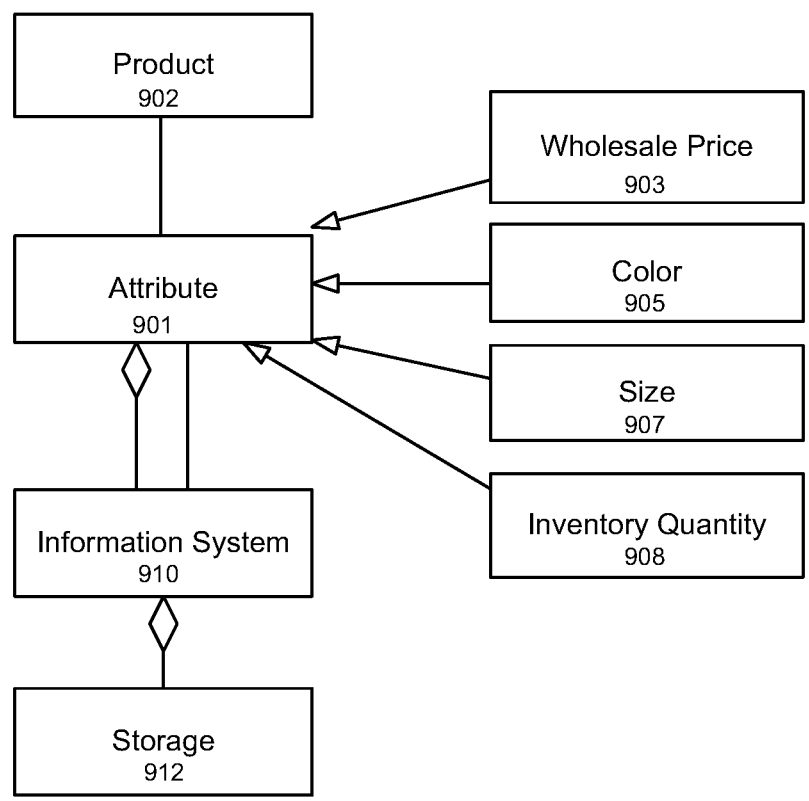
FIG. 9 shows the types of attributes (or metadata) of a product.

FIG. 9 shows the types of attributes (or metadata) of a product. These attributes 901 are associated with a product 902. Some attributes can include the wholesale price of the product 903, the colors available for the product 905, the sizes for the product 907, and the inventory quantity available 908. Attributes can be owned and stored in an external information system 910 and 912. In this case, the attribute values displayed in a collection book for a product will be automatically updated when the values are changed in the source information system.

Figure 10:
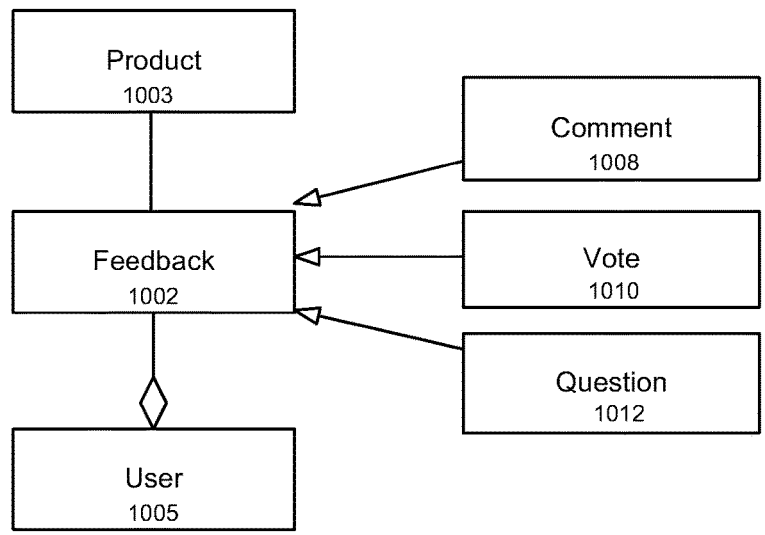
FIG. 10 shows a feedback function of the system.

FIG. 10 shows a feedback function of the system. Feedback 1002 is associated with a user 1005 and a product 1003. Types of feedback include a comment 1008, a vote (or poll) 1010, or question 1012.

Figure 11:
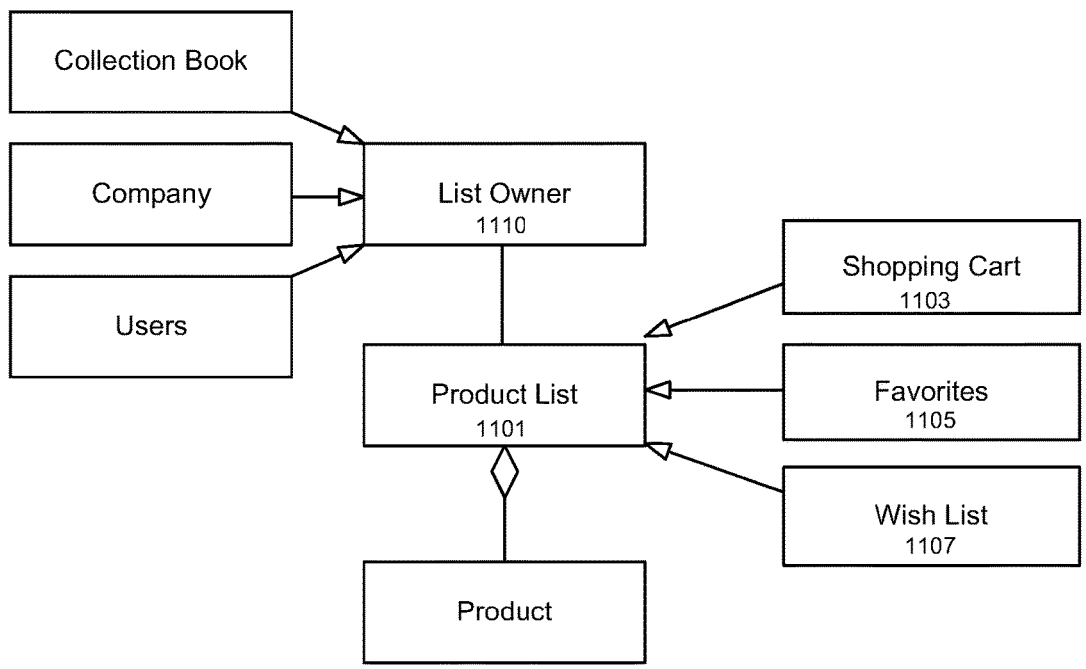

FIG. 11 shows types of product lists that a product can be added to. For example, a product list 1101 for a user can include a listing of items in a shopping cart 1103, a favorites list 1105, or a wish list 1107. A list owner list 1110 is kept that specifies who owns a particular product list.

Figure 12:
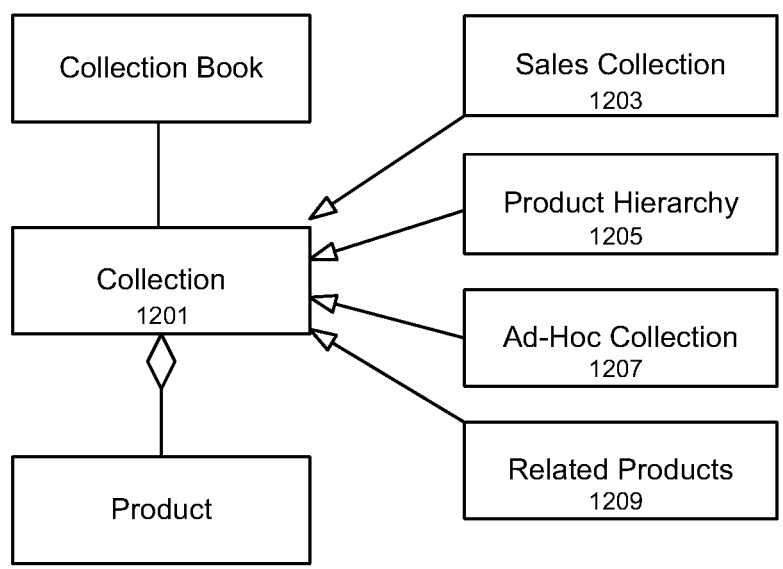
FIG. 12 shows types of collections that can be displayed in a collection book.

FIG. 12 shows types of collections that can be displayed in a collection book. A collection 1201 can include a sales collection 1203, a product hierarchy 1205, an ad-hoc collection 1207, and a related products 1209 collection. These collections are used by the system to display to a user of the system information on products, as well as some analytics to suggest things the user may be interested in.

Figure 13:
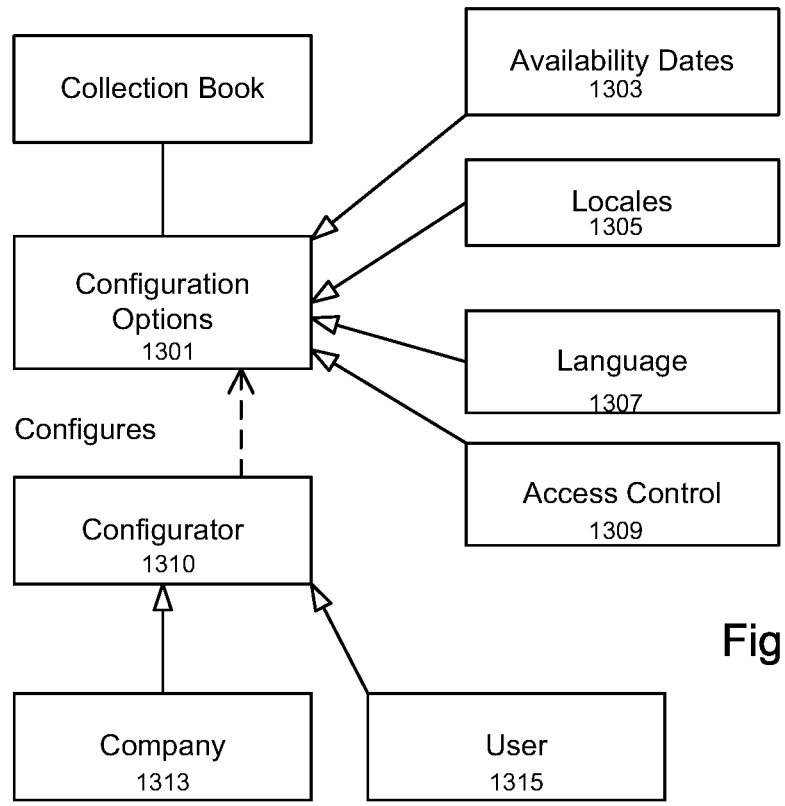
FIG. 13 shows types of configuration options for collection books.

FIG. 13 shows types of configuration options for collection books. These options allow the user to change options associated with a collection book. For example some configuration options 1301 include availability dates 1303, locales 1305, language 1307, and access control 1309. A configurator 1310 allows a company 1313 or a user 1315 to set the configuration options.

Figure 14:
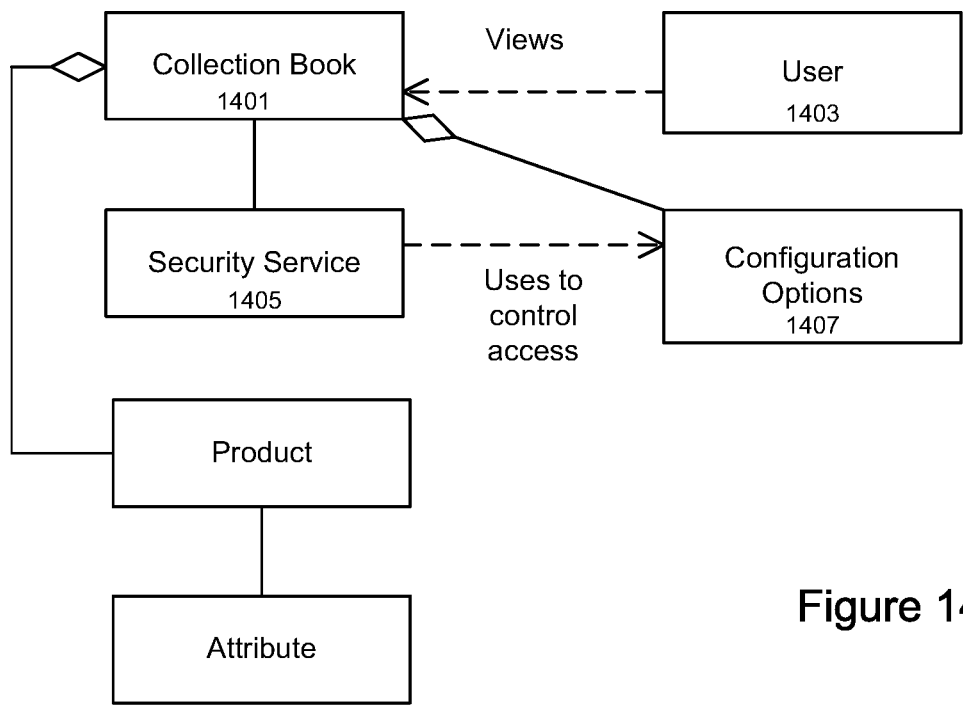
FIG. 14 shows a relationship between a user that views a collection book and a security service.

FIG. 14 shows a relationship between a user that views a collection book and a security service. For example, when a user 1403 attempts to view a collection book 1401, the security service 1405 associated with the collection book checks configuration options 1407 to determine whether to allow the user to access the collection book. Some configuration options include allowing a user to view only certain sections of the collection book. These can allow the system to limit visibility by hiding certain items the user should not see (e.g., an exclusive item to a competitor, items not ready for user feedback). The system can also limit attributes of an item in the collection book, such as certain colors that are no longer available.

Figure 15:
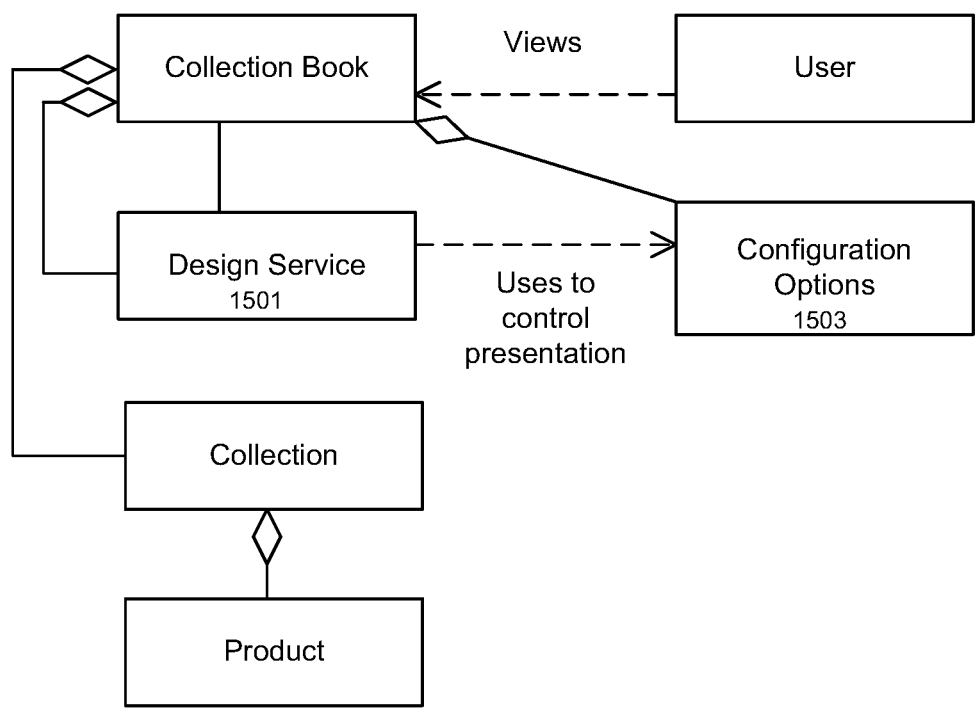
FIG. 15 shows relationships between a user that views a collection book and a design service.

FIG. 15 shows relationships between a user that views a collection book and a design service. A design service 1501 uses configuration options 1503 to control the presentation of products and collections displayed in a collection book.

Figure 16:
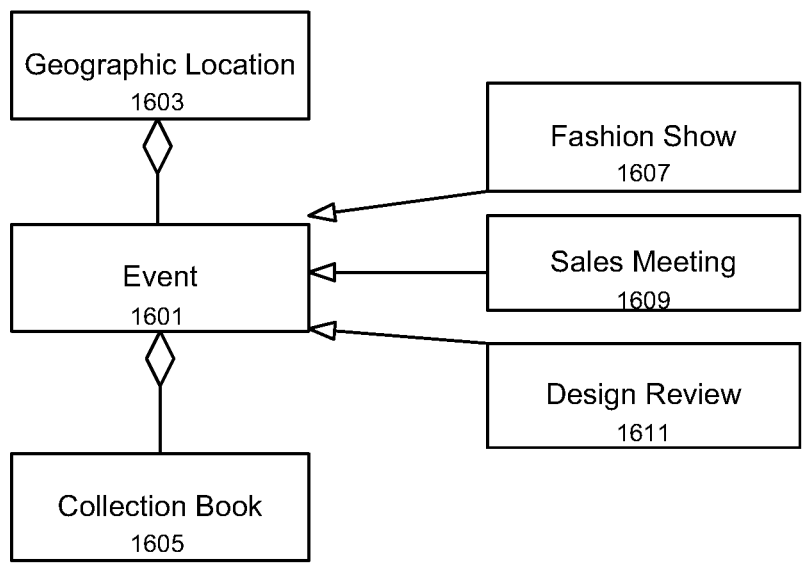
FIG. 16 shows relationships of an event in the system.

FIG. 16 shows relationships of an event in the system. An event 1601 is associated with a geographical location 1603 and a collection book 1605. If an event has more than one fashion house or designer, the system can associate multiple collection books with an event. An event can also be associated with a fashion show 1607, a sales meeting 1609, and a design review 1611.

Figure 17:
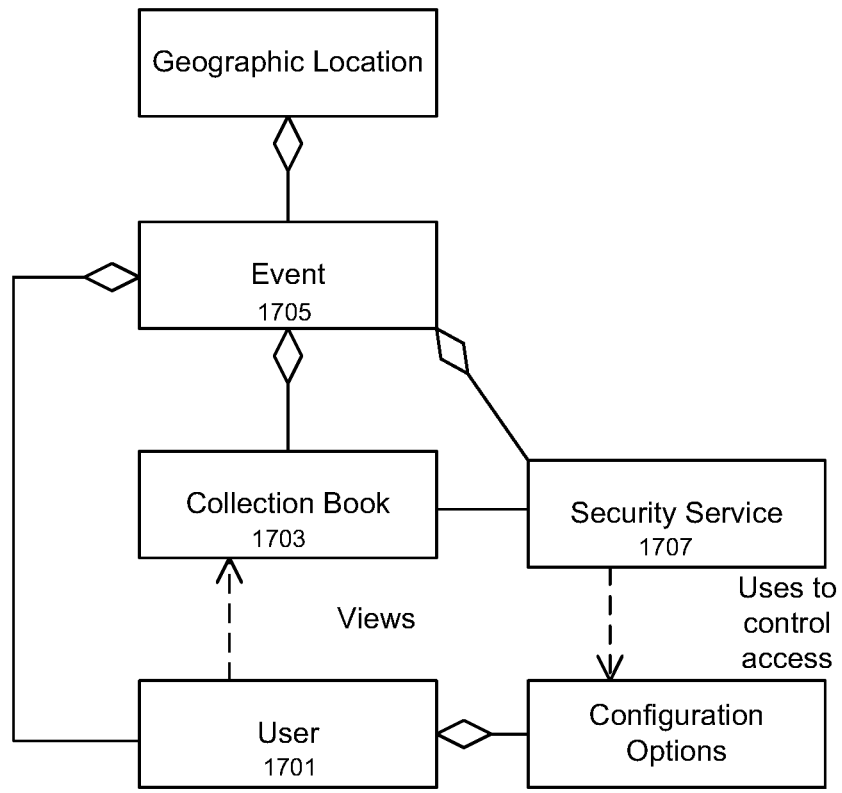
FIG. 17 shows relationships between a user that views a collection book, an event that the user is attending, and a security service that uses configuration options to limit access.

FIG. 17 shows relationships between a user 1701 that views a collection book 1703, an event that the user is attending 1705, and a security service 1707 that uses configuration options to limit access. For example, the user is provided with an invitation to the event, then the user can only view a collection book when present at the event.

Figure 18:
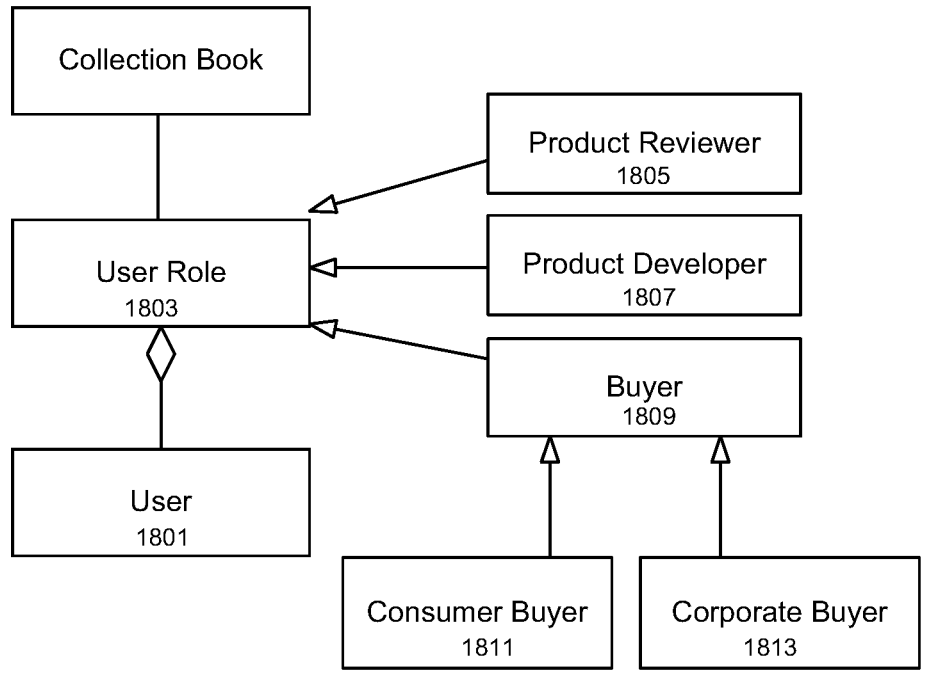

FIG. 18 shows types of roles a user can be associated with. A user 1801 is connected to a user role 1803 attribute. These attributes can include whether the user is a product reviewer 1805, a product developer 1807, or a buyer 1809. There can be at least two types of buyers, a consumer buyer 1811 and a corporate buyer 1813. The system can use this information, to target information shown in the system to the user based on the role the user has. For example, a consumer buyer will likely not need information on bulk purchase quantities and pricing, while a corporate buyer would. Thus, the system can hide information on bulk purchases from the consumer buyer and display the bulk purchasing information to the corporate buyer. These attributes can be used in conjunction with the security service as discussed elsewhere in this document.

Figure 19:
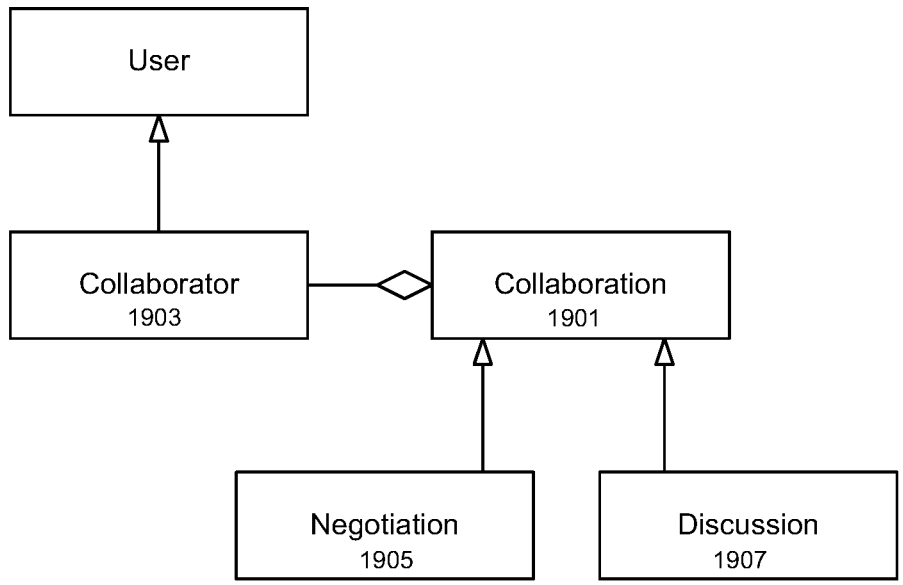
FIG. 19 shows a relationship between collaborator and collaborations.

FIG. 19 shows a relationship between collaborator and collaborations. A collaboration is a project that multiple people (or users) work on to achieve a common purpose. A collaboration 1901 has collaborators 1903. The collaboration includes negotiation 1905 and discussion 1907. The system will facilitate a collaboration between two people by storing data on the collaboration. As information related to the collaboration is changed, the information is made available to other collaborators in the system. For example, an e-mail alert or other alert is sent to users associated with the collaboration.

In an implementation, a discussion is a type of collaboration. In yet another implementation, a price negotiation is a type of collaboration. An example is when two users are working together to find products to buy. If a collection book or catalog of a fashion house or designer is large, a first user can focus on a first part of the collection book and a second user can focus on a second part of the collection book. The first part of the collection book can be the men's outdoors clothing section and the second part of the collection book can be the women's formal wear part. On the other hand, the first and second users can be working together to fill the same section of a store in the same section of the collection book. The first and second users are looking at the same catalog on two devices. Each time one of the users finds a product, the user can add it to a shared favorites list so they can discuss the product with the other user later. This can be helpful for larger buyers of clothing (such as for a larger clothing Macy's Inc.) that has many persons purchasing on their behalf.

In another implementation, a negotiation is a type of collaboration. This can happen when a user is discussing with a fashion house on a price for products. For example, the user can request the fashion house to reduce the price of its product by asking them to include fewer zippers or other options on a garment, so that the cost of parts and labor is reduced.

Figure 20:
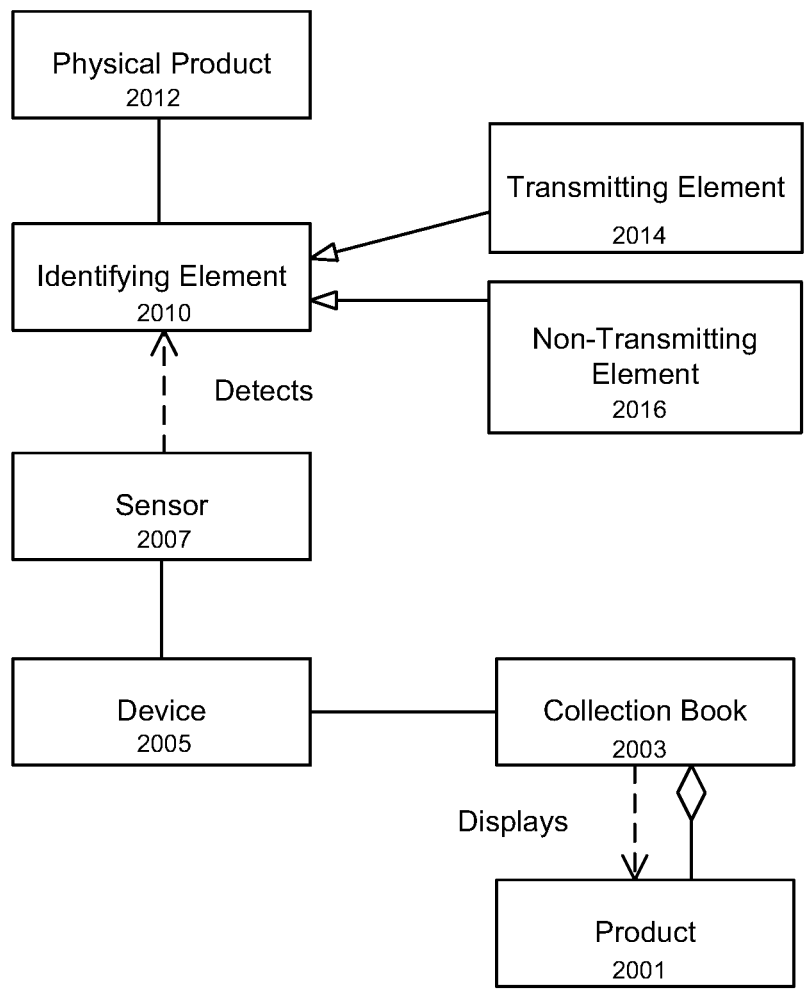
FIG. 20 shows a relationship between a physical product and a product displayed in a collection book.

FIG. 20 shows a relationship between a physical product and a product displayed in a collection book. A product 2001 is displayed in a collection book 2003. A device (e.g., the mobile device the system is running on) 2005 contains a sensor 2007. The sensor is used to detect a physical product 2012 that contains an identifying element 2010. The identifying element can be a transmitting element 2014 (e.g., active RFID tag, or other similar technology) or a non-transmitting element 2016 (e.g., barcode, passive RFID).

Figure 21:
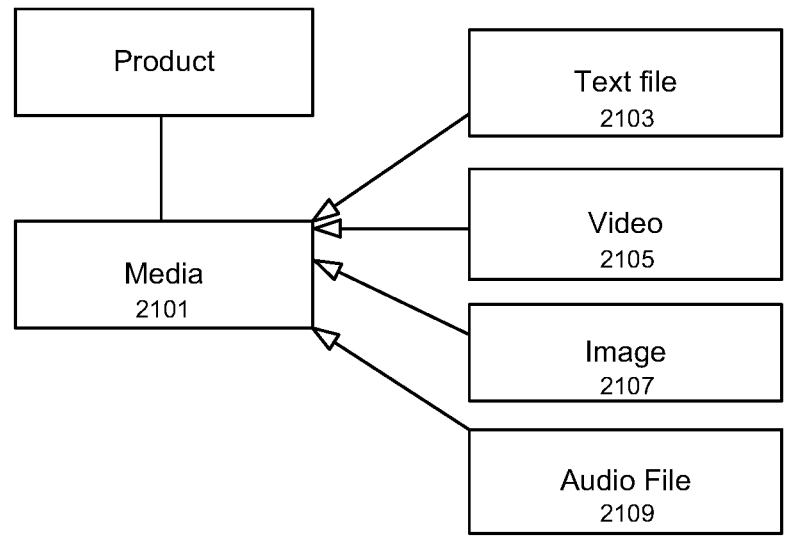
FIG. 21 shows types of media files that can be associated to a product that is displayed in a collection book.

FIG. 21 shows types of media files that can be associated to a product that is displayed in a collection book. Some media 2101 that a product can be associated with are a text file 2103, a video 2105, an image 2107 (a two-dimensional or three-dimensional image), or an audio file 2109.

Figure 22:
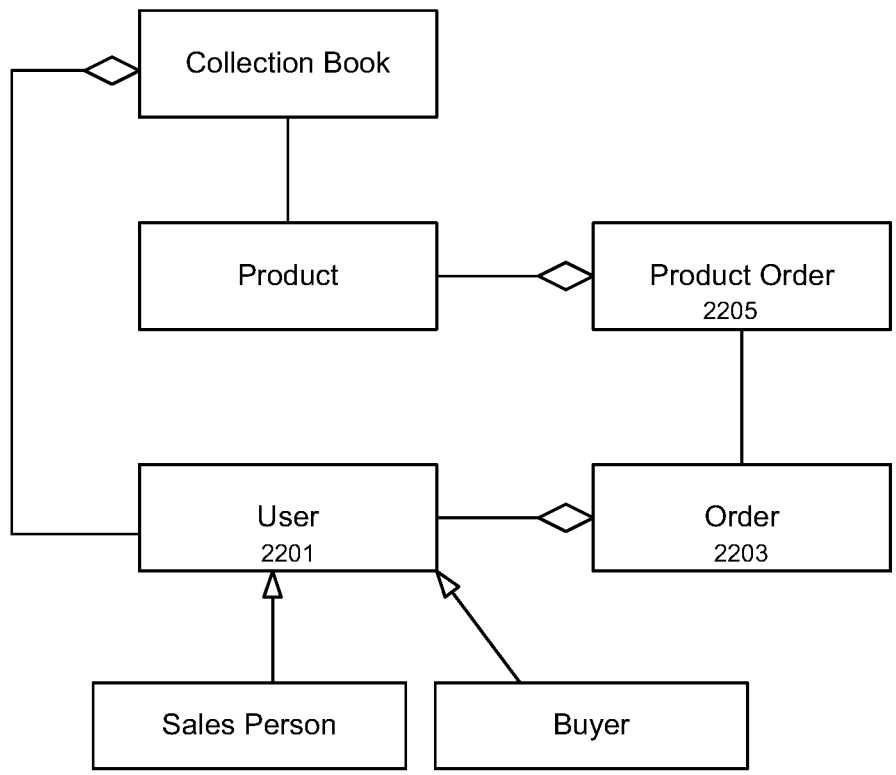
FIG. 22 shows a relationship between a product and an order.

FIG. 22 shows a relationship between a product and an order. A user 2201 can place an order 2203 and the product order 2205 is in turn associated with a product. The order may be associated with one or more users.

Figure 23:
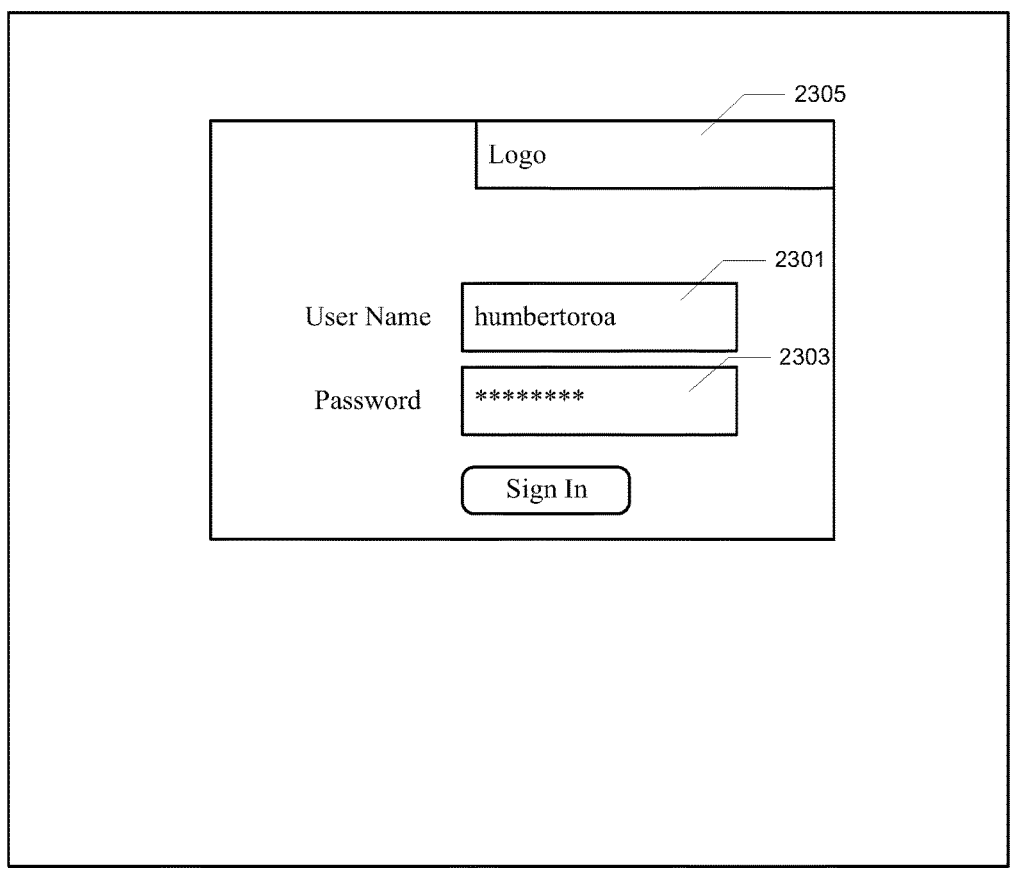
FIG. 23 shows a login screen of the system.

FIG. 23 shows a login screen of the system. This screen displays a user name box 2301 and a user authentication credentials box 2303. In this example, the user is requested to provide a user name and password. An image of a company's logo 2305 whose products will be displayed can also be included.

Figure 24:
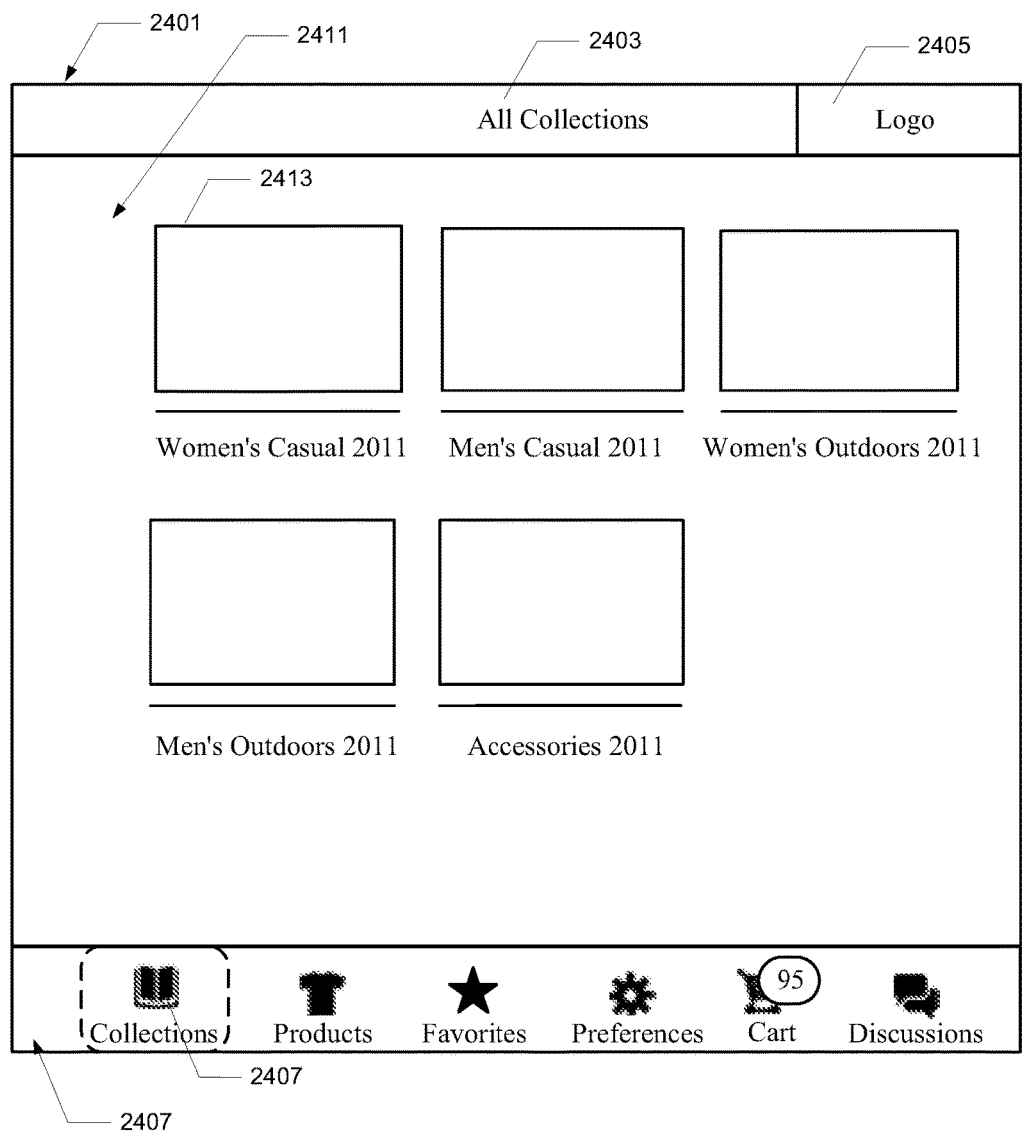
FIG. 24 shows a collections interface of the system.

FIG. 24 shows a collections interface of the system. In an implementation, most of the displays of the system can be divided into three general sections. These three general sections can be used to present similar information throughout the system, so that the user has a unified user interface experience.

The first section is a header section 2401. The header section indicates what the user is currently viewing 2403. For example, the screen is currently viewing "All Collections." There is also a logo 2405 or other indicator with the header so that the user knows the owner or company of the current collection.

Another general portion is the tab or menu bar 2407. The tab bar allows the user to change the page viewed. For example, the user is currently viewing the "Collections" tab 2409, as designated by the dashed bracket around the "Collections" item. If the tab bar is visible, the user can quickly navigate between different tabs by selecting the tab bar. The system can remember what the user is doing at a specific tab, so that if the user returns to the first tab, the system can restore the user's progress at that tab. In an implementation of the system, designating whether something is selected is shown using shadows (e.g., shadows around the contours of the item), shading, coloring, or other similar methods.

A third general portion is the main portion 2411 of the screen. The main portion displays the details on what the user has selected to view. For example, in this screen the main portion shows all the collection books that the currently logged in user is able to open. On this screen, the user is allowed access to five collection books. In an example, the first collection is "Women's Casual 2011" 2413. In an implementation, collection books can be divided by other categories. For example, the collection book can be divided by year only, designer line, apparel types (e.g., big & tall, blazers, coats, under garments, shirts, pants, accessories, swim, or others), seasonal wear, or others.

Users can be allowed access or restricted access to collection books. The collection books are displayed using an image and a text description. The user can open the collection book by selecting the collection book. Selecting an item in the system includes clicking using a mouse, touching the item on a display, using arrow keys to navigate to an item, or other similar methods. The collection book can be selected by touching either the image or the text description of the collection book.

Figure 25:
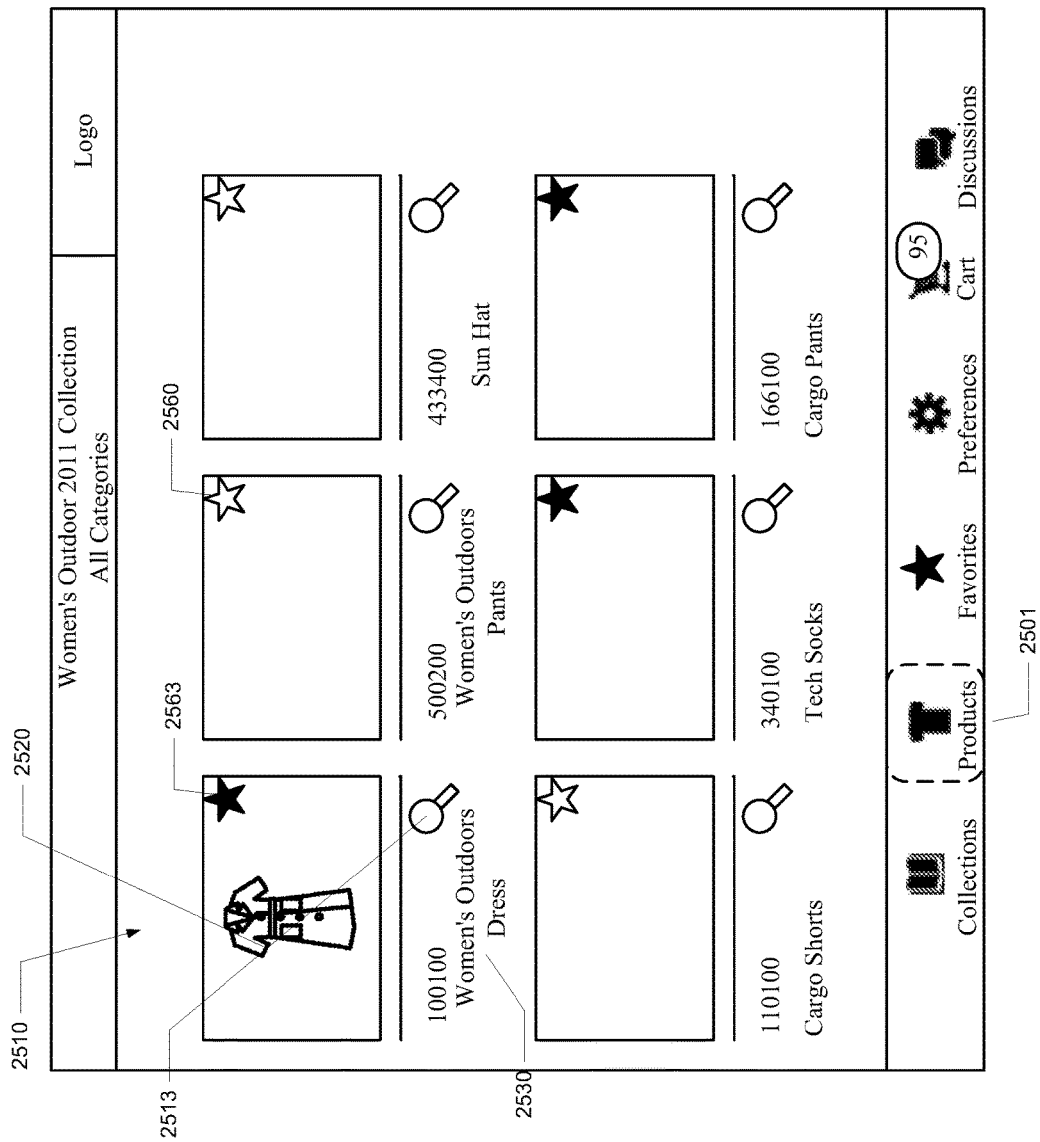
FIG. 25 shows a main collection book interface of the system.

FIG. 25 shows a main collection book interface of the system. The user can navigate to this page by selecting the products tab 2501. The user can also navigate to this page when the user selects a collection book from the collections tab, which switches the page to the products tab. On this tab, the user is able to view the products that are in the collection book. The collection book can be configured to display any product metadata. For example, in this diagram, each product's image, code, and description are displayed.

The user is presented with a page with a collection of products represented as images 2510. If there are more items than can fit on the screen, the user can change the page to another page with additional items by swiping their finger on the touch screen. Swiping to the left will change the page to the previous page, and swiping to the right will change the page to the next page. In another implementation, swiping up with go to the previous page, while swiping down will go to the next page. When the user would like more information about the product, the user can click on the product photo 2520, which will reveal more product information. In this example, when the user selects 2513, the user is presented with a blown-up picture of the associated item.

If the user would like even more information, the user can select the link under the product 2530, which will reveal another screen (i.e., product details screen) that contains additional information about the product. In an implementation, the link is a "learn more" button.

The user can also select items to add in their favorites listing, which is represented by a star icon. The user can toggle the favorites icon associated with a product by selecting it. When toggled, the star 2563 appears to be solid. When untoggled, the star 2560 appears to be empty. Toggling the star does not navigate the screen to another screen, so that the user can conveniently note items with a star without needing to go back and forth between screens.

Figure 26:
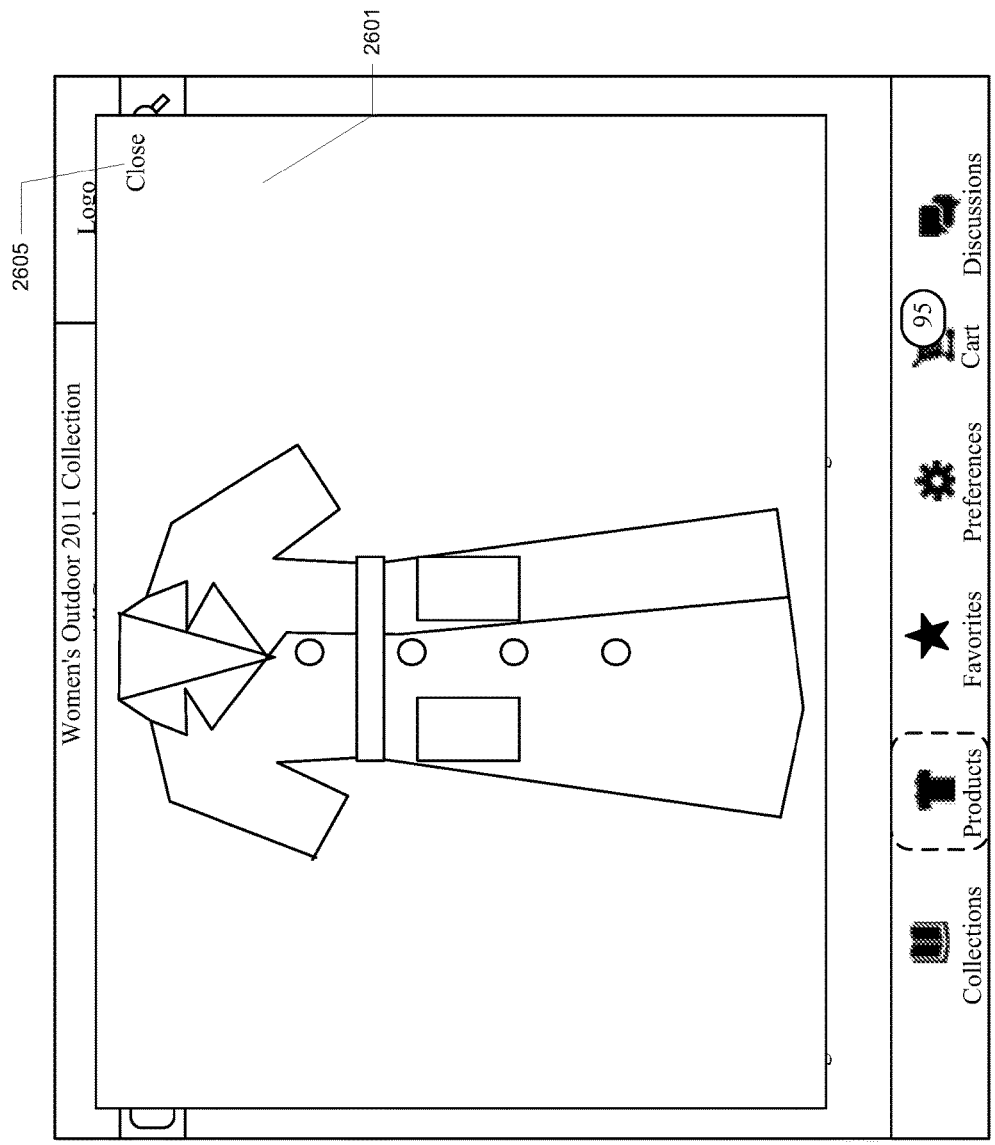
FIG. 26 shows an enlarged product view of the system.

FIG. 26 shows an enlarged product view of the system. For example, when the user selects 2513, an enlarged (or full-screen) product view 2601 pops-up. The pop-up can be closed by selecting the "Close" link 2605. When the pop-up is closed, the user is returned to the screen that the user was previously on. The user can zoom and pan the image by using touch screen gestures. For example, the user can touch the screen with two fingers and draw the fingers together to zoom in. Or, the user can touch the screen with one finger and slide the finger up, down, left, or right to pan the image. The user can also use a swipe gesture to view the next product. This is accomplished by touching the screen with one finger, and moving the finger tip left or right in a quick motion.

A window is a pop-up window that appears when a user does an associated interaction. Pop-up windows usually do not fill the entirety of a screen, so that at least a portion of the screen that generates the pop-up is displayed. When closing a pop-up, the user is returned to the screen that created the pop-up.

Figure 27:
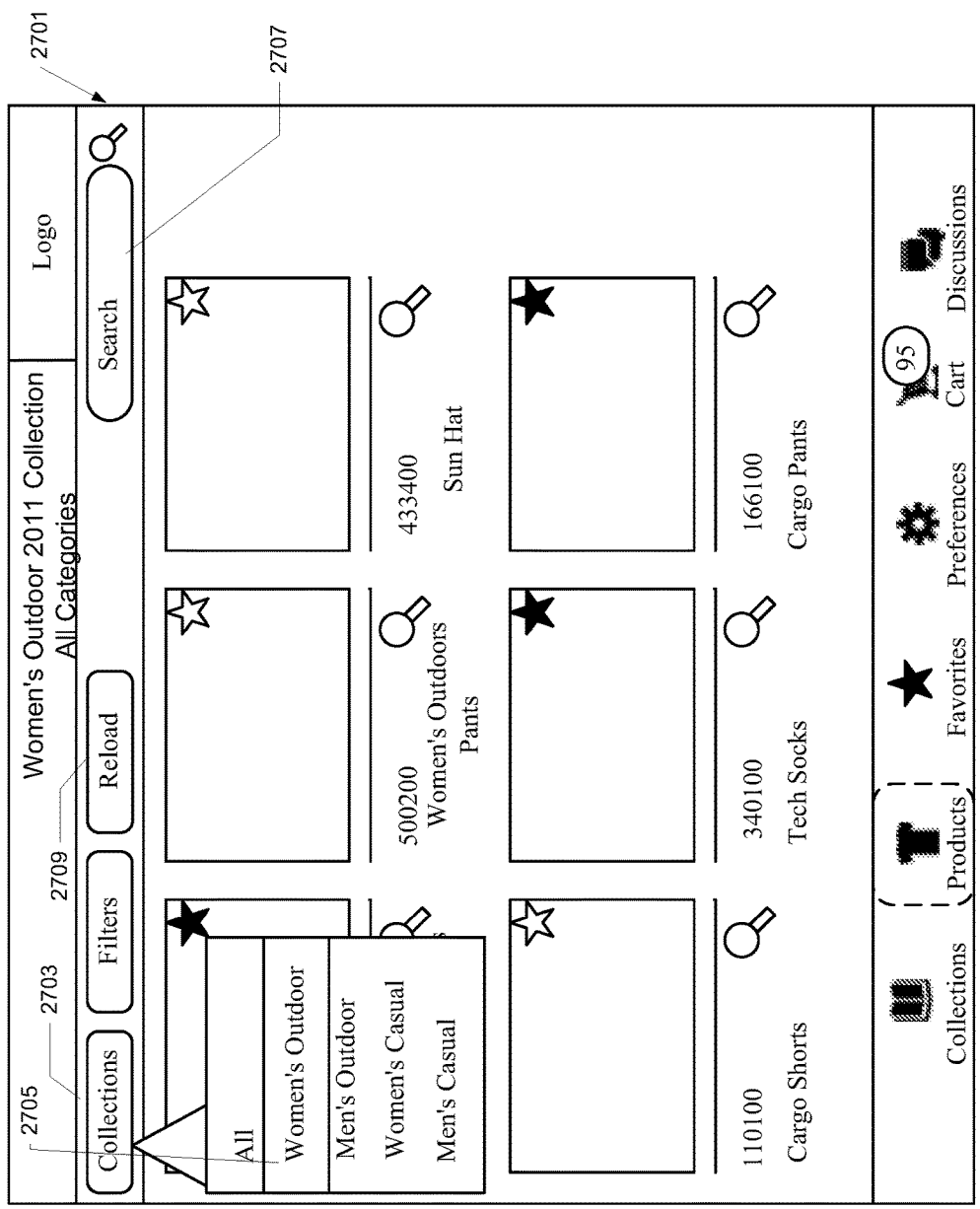
FIG. 27 shows a title bar of the system.

FIG. 27 shows a title bar of the system. A title bar 2701 is used to provide additional functions to the user. For example, selecting the "Collections" button 2703 will open a menu 2705 with a list of collections. If a collection is selected from the list, then only the products that are associated with this collection will be displayed. The menu can be implemented as a pop-up window.

The title bar can include a search box 2707. When the user clicks on the search box, they can enter text. The search will filter products by searching for the search string value in the products metadata. For example, if the string "Pants" is entered into the search field, then only products that have the string "Pants" in one of the metadata fields will be displayed. The filters can be removed by selecting the reload button 2709 or selecting "All."

In an implementation, the title bar 2701 is a slide down bar. This means that if the user touches the title bar, then a search panel or menu will slide down from under the title bar. The user can use the controls in this panel to filter the products that are displayed to produce a small set of products.

Figure 28:
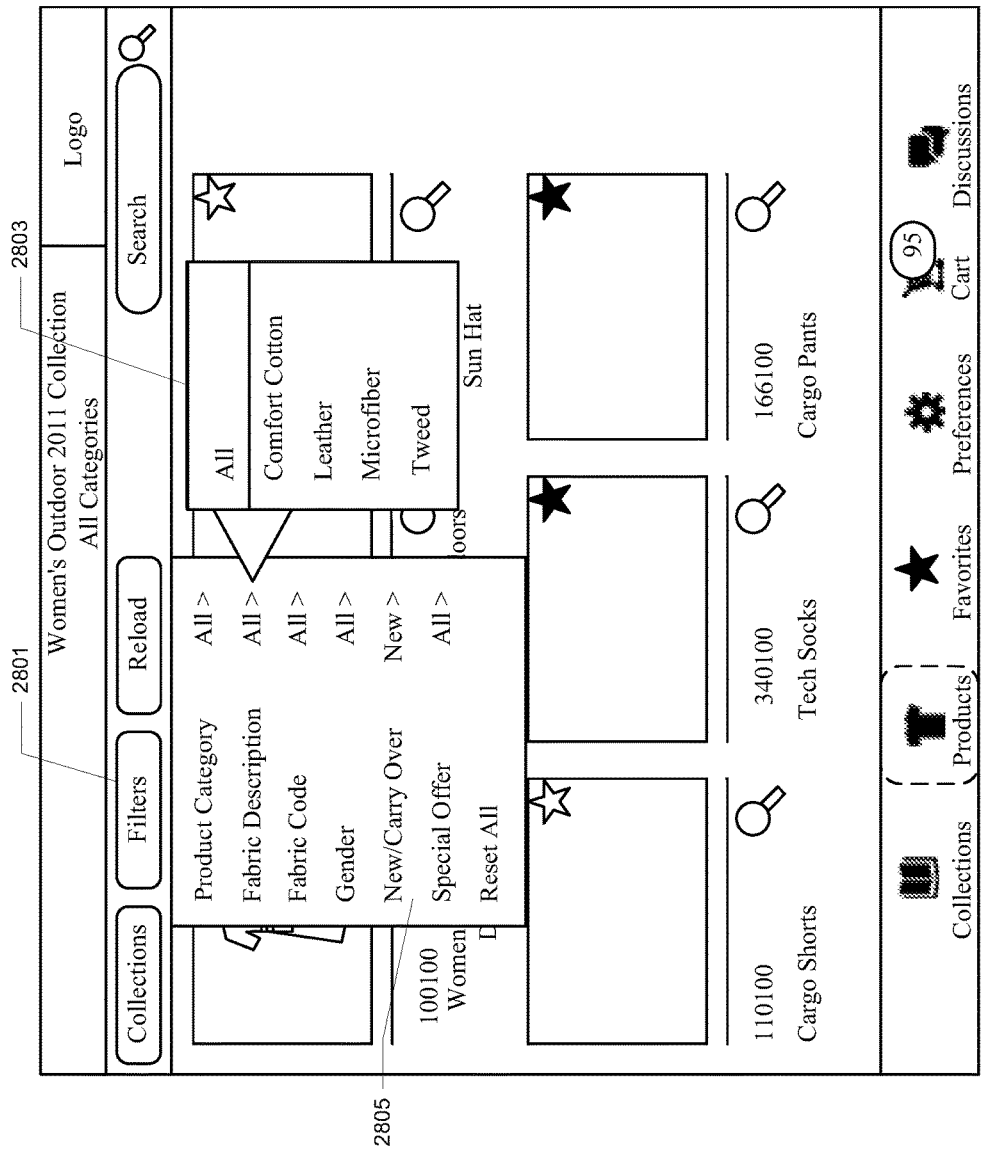
FIG. 28 shows the title bar of the system.

FIG. 28 shows the title bar of the system. The "Filter" button 2801 shows metadata of products of the system. The user can select this metadata, to narrow the scope of the products they are viewing. For example, the user can select the filter "Fabric Description" and a submenu 2803 lists the filter options available by fabric description. In the example, the option "New/Carry Over" 2805 has been selected as "New." So results will include only new items. Multiple filters can be applied at the same time. The products that are displayed will be updated as filter options are selected.

Figure 29:
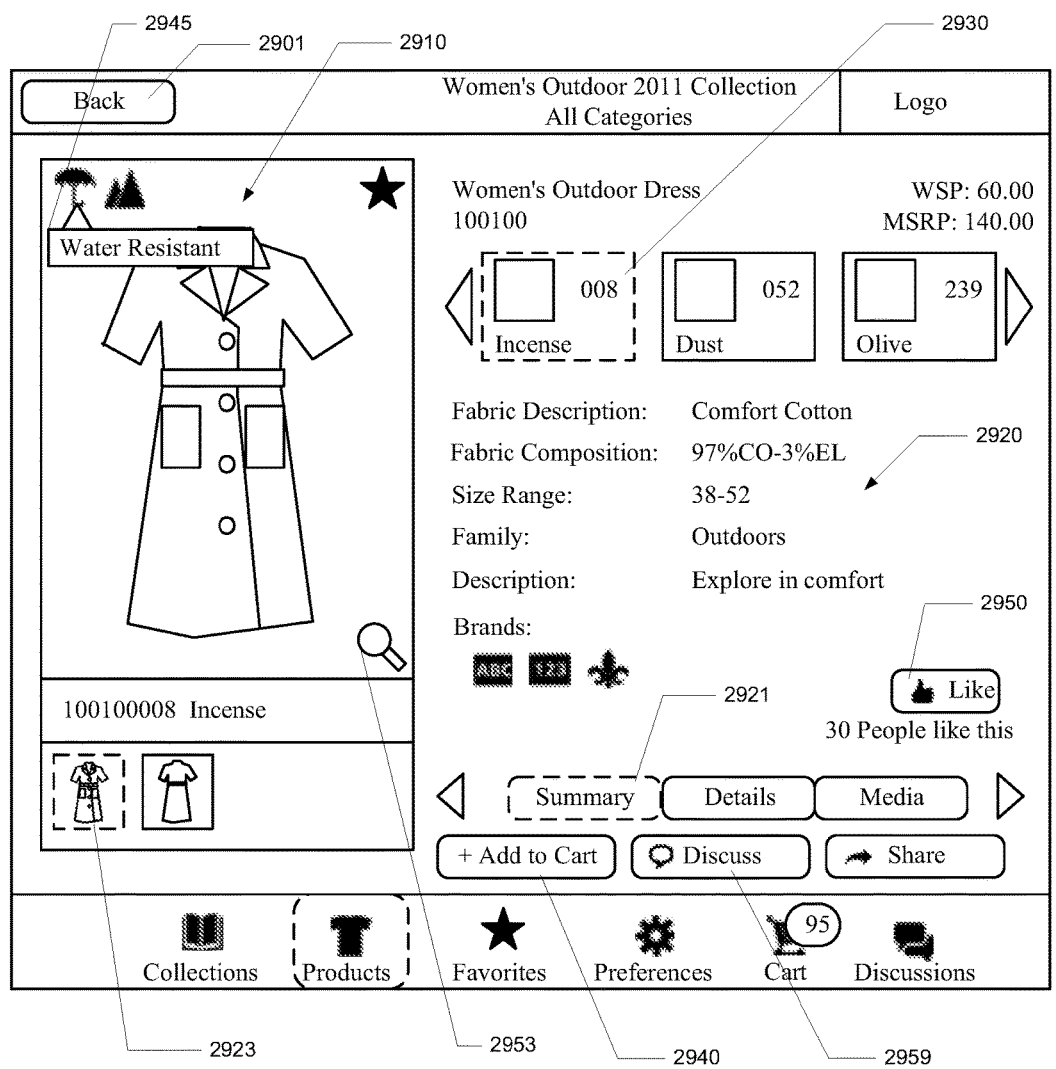
FIG. 29 shows a products details view of the system.

FIG. 29 shows a products details view of the system. This view can be navigated to by selecting the product image or metadata values in the products tab. The user can return to the products view by selecting the "Back" button 2901 in the header bar or by selecting another tab in the tab menu. This view has two sections. On the left, there is an image viewer 2910 and on the right is a metadata viewer 2920.

The image view displays the image associated with the product. If there is more than one image, then a thumbnail of the other images will be displayed at the bottom of the view 2923. The user can view an image by selecting the thumbnail image. A larger version of the product image is available. If there are multiple images, the user can browse through the images.

In the metadata viewer, product metadata values can be displayed. The metadata view is divided into segments, and a segment can be selected by touching a button representing the segment at the bottom of the view. For example, this product has three segments available: summary, details, media.

In the summary segment, the metadata values for the product name, code, wholesale price, and retail price are displayed at the top of the segment. The user can see the metadata 2920 associated with the item. In this example, attributes include the model number, the fabric description, the fabric composition, and the price. This can include the code and name of the product and color combination.

This information is a part of a summary selected by the "Summary" button 2921 of the most important details of the item. The user is presented with a scrollable list of colors 2930 available for the item. In this example, the color Incense is selected and there are available colors Dust and Olive. Additional colors can be seen by clicking the arrows to the left or right of the list. The user can also open a full screen view of the image by selecting the magnify button 2953.

Below the colors, additional product metadata values are displayed. Some metadata fields can contain values that are not strings. For example, the metadata field for brands list the brand of the components used in the product like fabrics. For this field, the brands are displayed using the image logos for the brands.

When the user is satisfied with the configuration, the user can select the "Add to Cart" button 2940. This will add the configured product to the user's shopping cart. Selecting the add to cart button will open a dialog view that allows the user to enter the desired quantity for each size and color combination. Selecting discuss button 2959 will open a dialog view that allows the user to enter a question or comment about the product. Selecting the share button will open a dialog view that will allow the user to select the means to share the product and the people to share the product with. Means to share can include e-mail, SMS, and twitter. A link to the item will be shared so that when the link is selected, the collection book application with the product selected is shown. Person whom the user shares the items with must have permission to view the product.

The system can include a like button 2950. Selecting this allows the user to increase the count of people who like the associated product. This will increment the like counter that is displayed below the button. In an implementation, this function integrates with social networking systems. For example, the system can interface with Facebook®. Facebook is a registered trademark of Facebook, Inc.

Important information on the item can also be represented by icons. For example, the umbrella icon 2945 is used to show that an item is water resistant. A mountain icon indicates the product material is rip resistant. When a user hovers over the icon, a description of what the icon means is shown as a pop up.

Figure 30:
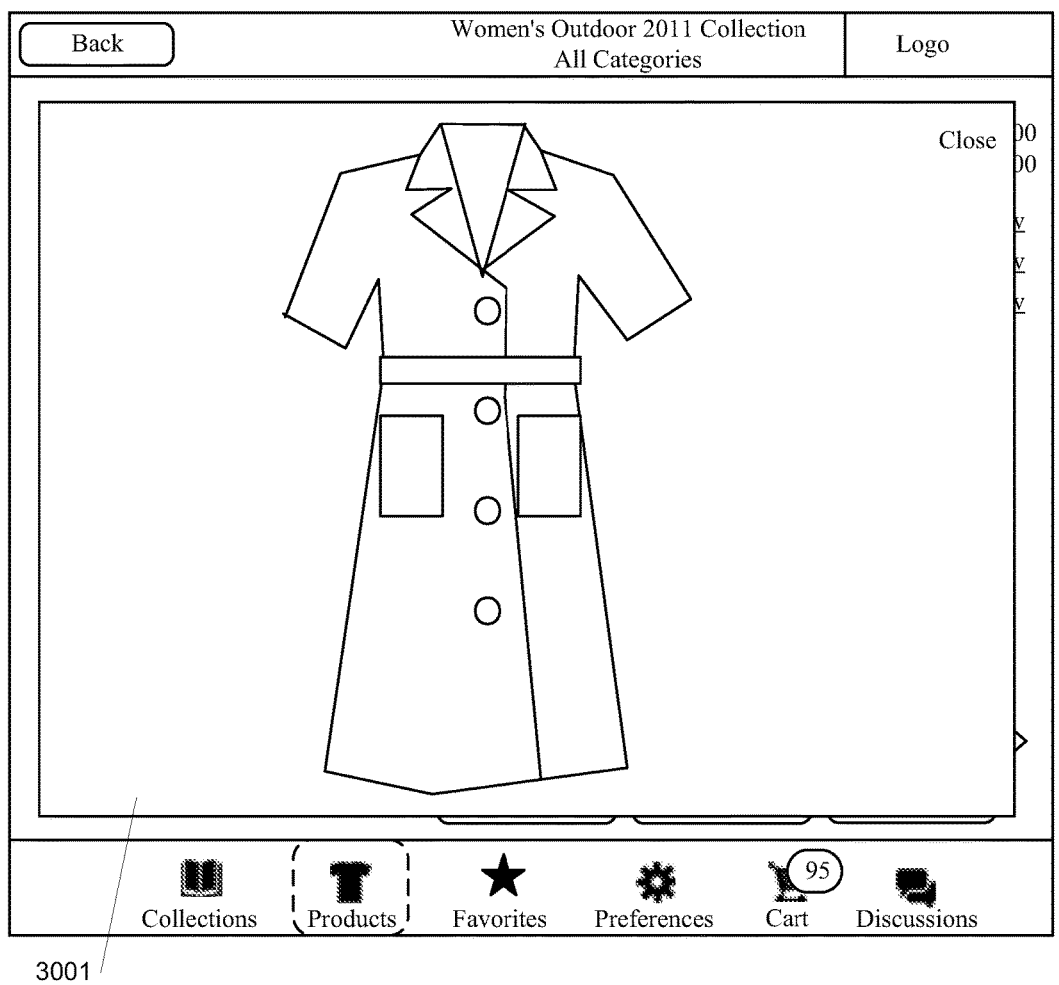
FIG. 30 shows an enlarged product view of the system.

FIG. 30 shows an enlarged product view of the system. An enlarged image 3001 of the item is shown. This can be accessed by the magnify button 2953.

Figure 31:
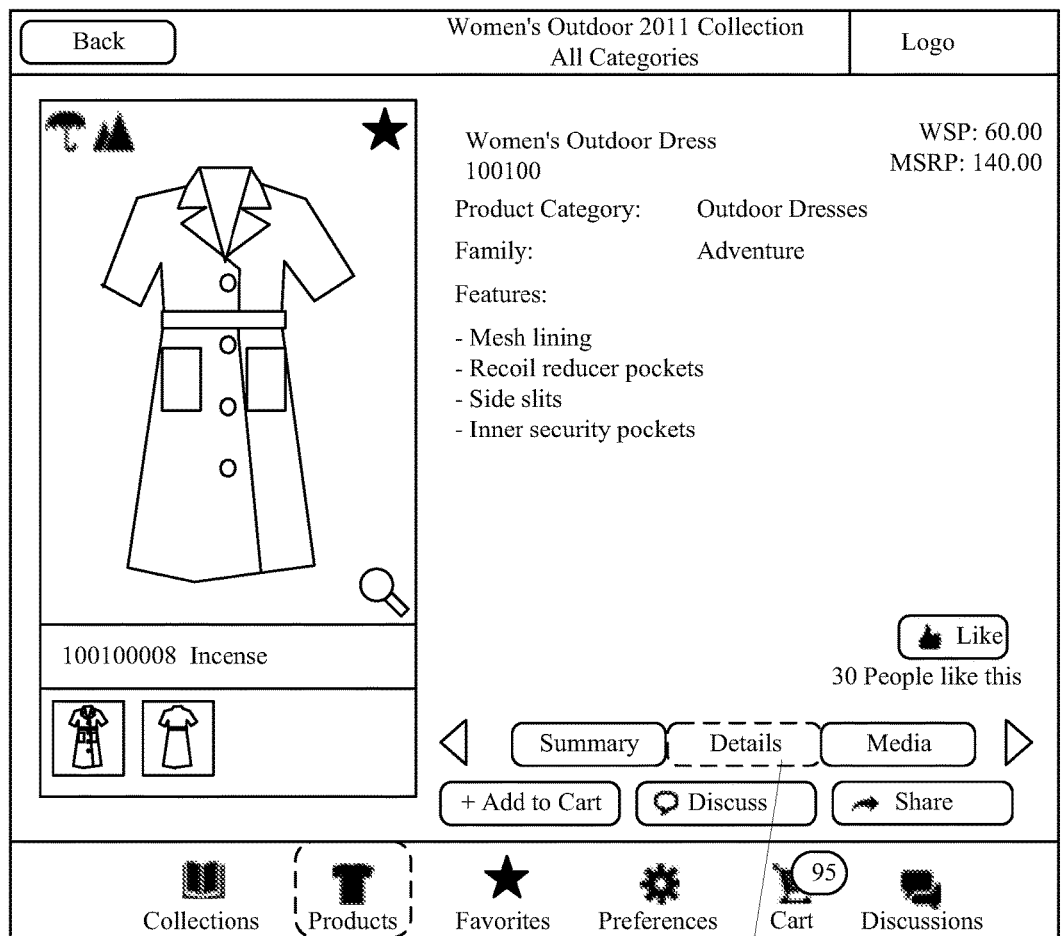
FIG. 31 shows details of a product of the system.

FIG. 31 shows details of a product of the system. When the details button 3101 is selected, metadata that is not able to be shown in the summary view is given. This can be information that is non-essential for the user to view or for information that does not fit in the summary screen.

Figure 32:
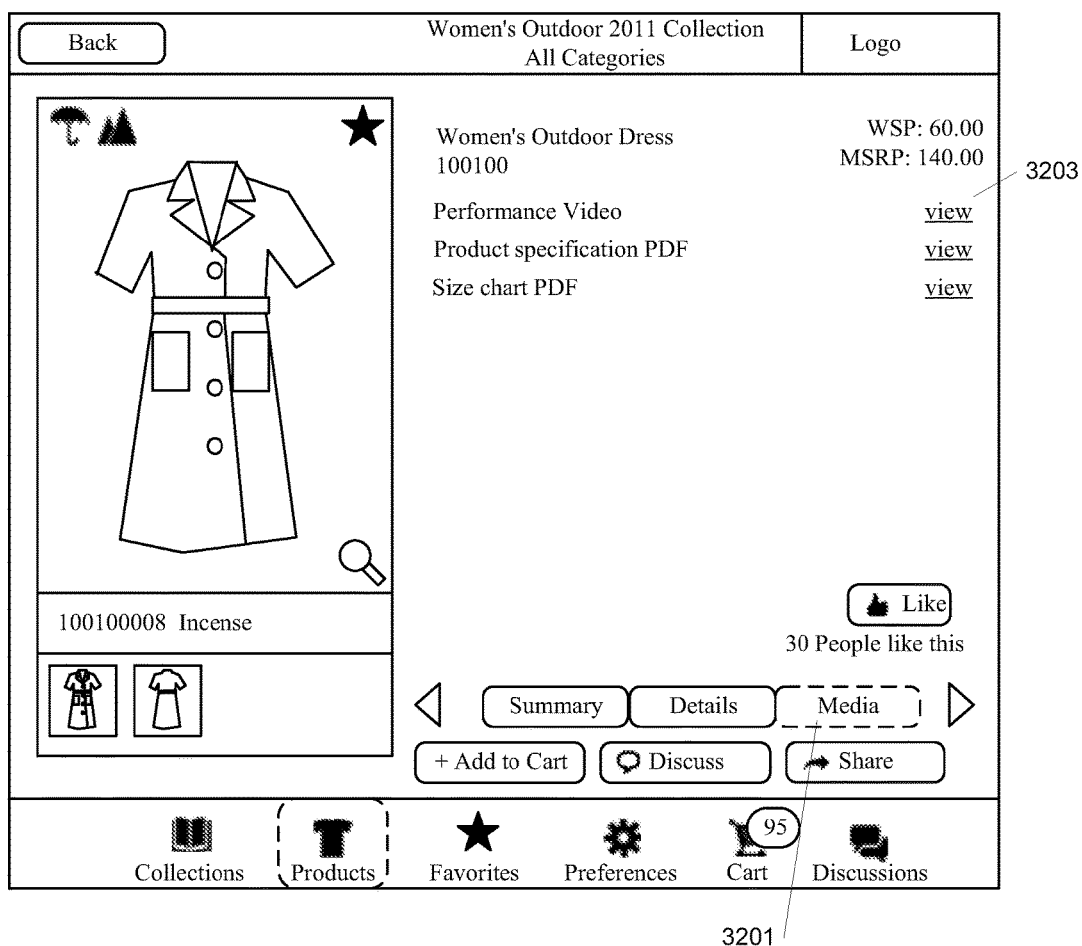
FIG. 32 shows media of a product of the system.

FIG. 32 shows media of a product of the system. This information is shown when the media button 3201 associated with an item is selected. Each media file has a view action that will open the media file in an appropriate viewer. For example, if "Performance Video" 3203 is selected, a video playing software appears and will play the video on the device. In an implementation, the video software is integrated with the system, so that viewing a video does not exit the user out of the system. This can be done using a pop-up window that shows the video.

Figure 33:
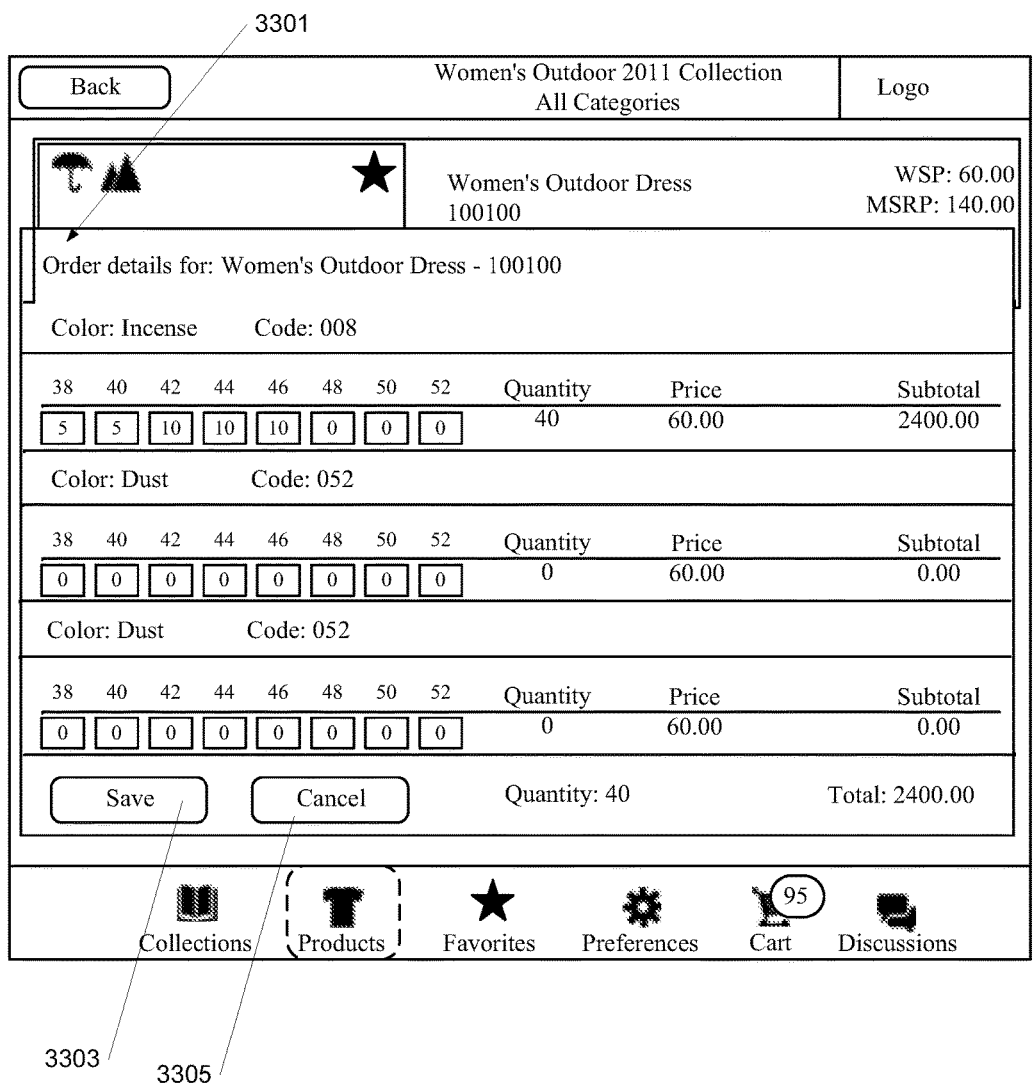
FIG. 33 shows details for an order of the system.

FIG. 33 shows details for an order of the system. When the user selects the "Add to Cart" button, a dialog 3301 is displayed that allows the user to enter quantities for each size and color combination for an item. For each color, the size is displayed a top row. The user can enter a quantity for each size on a bottom row by entering a value. When the quantities are changed, the application recalculates the subtotal amount for each color and the total amount for all the colors. The user can then select the save option 3303 to save the quantities and close the dialog, or the user can select cancel 3305 to reset the values and close the dialog.

Figure 34:
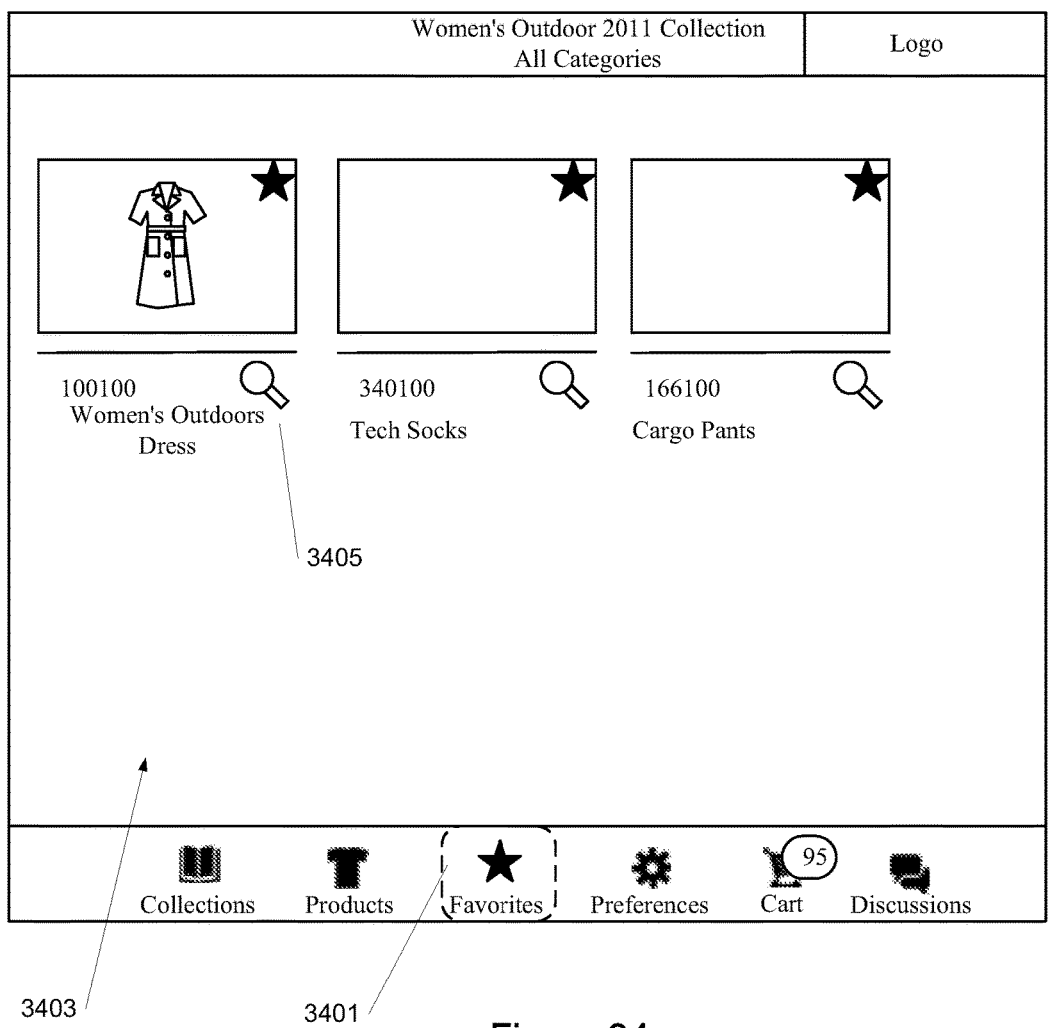
FIG. 34 shows a favorites tab of the system.

FIG. 34 shows a favorites tab of the system. To navigate to this, the user selects the favorites tab 3401. A list of items the user's favorites are shown 3403. This list can be persistent, so that even when a user signs off, their list of favorites remains in the system. This allows the user an easy way to keep track of an item they are interested in, as well as quickly remove items they loose interest in. The magnify button 3405 opens the product image in a full screen viewer.

Figure 35:
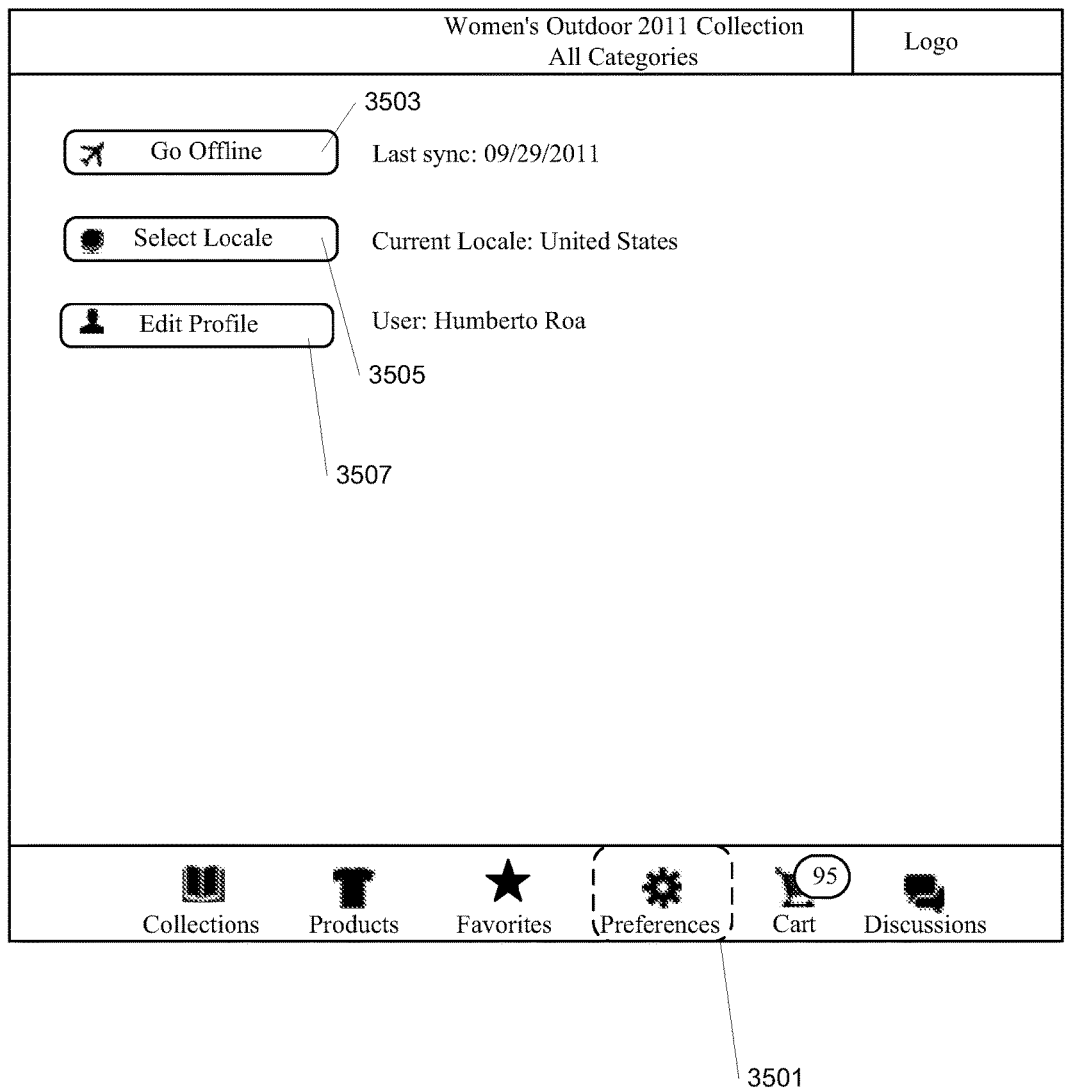
FIG. 35 shows a preferences tab of the system.

FIG. 35 shows a preferences tab of the system. To navigate to this screen, the user selects the "Preferences" tabs 3501. The user can select the "Go Offline" button 3503 to use the system while having no internet connection. For example, parts of the system may be hosted on the cloud or a server, so when the user disconnects their system from the Internet, the mobile device will no longer be able to access it. Some situations it may be useful to go offline are when the user is going to another location that does not have an available internet connection, where there is an available internet connection but the connection is not secure, or because the user likes the additional speed of the system when everything is precached on their mobile device. The system displays to the user when the system last synced to a server of the system. This information is important since, if the system has not been synced in a long while, the user may be using out of date information. For example, an item previously available may no longer be available.

There is a "Select Locale" button 3505. This can allow the system to provide customizations based on a locale. For example, the locale can assist in determining what language to use in the system (e.g., using Italian if the locale is Italy). In an implementation, this is useful in situations where the mobile device is having difficulties generating the proper location of the user or where the mobile device is unable to determine the location of the mobile device. The locale can be set to various accuracies. For example, the address can use a zip code, country, province, longitude and latitude, continent, state, showroom, exhibition area, or other similar methods of determining location. The system has an "Edit Profile" button 3507. The user can use this to edit the current user's information (e.g., contact information, password, username, or other).

FIG. 36 shows a cart tab of the system. This can be navigated to by selecting the "Cart" tab 3601. The cart tab can include a number 3603, indicating how many items are in the user's cart without selecting going to the cart tab. In this example, the user has 95 items in their cart. The cart tab displays the quantities of products that have been added to the cart. Each row in the cart displays the quantity for each color. For each color, the size is displayed on top of the quantity. The user can enter a quantity by tapping the quantity input field, and then entering a value. When the quantities are changed, the application will recalculate the subtotal amount for each color and the total amount for all the colors. Also, the row total is displayed. In an implementation, at the end of the row, the user can remove the item from the cart by clicking a remove button.

In an implementation, this screen can include a link to pay for the items. When the user is satisfied with the cart contents, the user can select a pay button, which will submit the shopping cart to a server for order processing. If the company has the products available for delivery, then the server will process the shopping cart as an order, and will start the order workflow processes to fulfill the order. If the product is not available for delivery (e.g., the product is a preproduction prototype), the server will process the shopping cart as a pre-order, and will start the appropriate pre-order workflow processes.

FIG. 37 shows a "Discussions" tab of the system. The user can navigate to this tab by selecting the discussion tab 3701. The discussions tab displays discussions that have been started for products. For each product, the product image, code, and description are displayed. Under the product details, the discussions that have been started for the product are displayed. Each discussion question is displayed with the date the question and the name and picture of the user. Other users can reply by clicking the reply button. This will launch a dialog to enter a remark. For example, the system provides a unified interface for a potential buyer (or user) to reach a designer. For women's outdoors dress item 3705, the user asks a question 3707. The designer replies to the user's question 3709, which will appear in the system. The system also shows who, if anyone, has liked a particular item 3711. Other uses of the discussions tab is to store information on votes (e.g., whether a product has enough votes to make it to product) or comments (e.g., suggestions for changes to the next iteration of an item).

In an implementation, if there are too many items in a list to be shown, the system recognizes a swiping motion to let the user scroll through to additional items on the list. Swiping can be done using a touch screen where the user places their finger on the screen, then moves quickly in a direction. The list will then scroll according to the direction.

Figure 38:
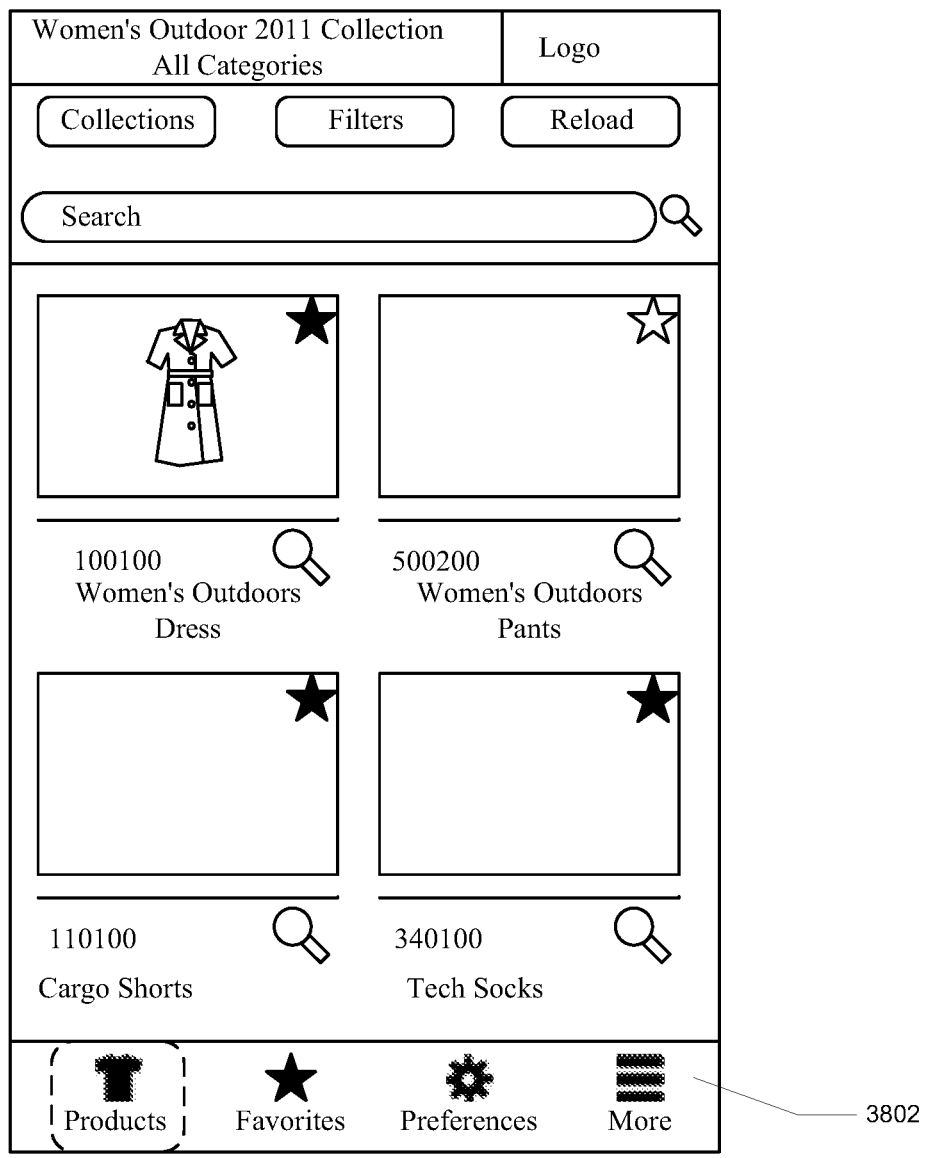
FIG. 38 shows an interface of the system, on a smaller screen.

FIG. 38 shows an interface of the system, on a smaller screen. The layout of the application screens will automatically adjust to orientation changes and to device screen sizes. This view displays the products tab for a small screen device in a portrait orientation. For example, this screen size can be approximately 8.9, 10.1, 17.8, or 25.7 centimeters. If the screen is too small to display all the tabs in the tabs bar, "More" button or tab 3802 allows the user to access the other tabs.

In an implementation, if the device orientation is changed (e.g., horizontal-to-vertical, vertical-to-horizontal), then the position and size of the main section will change. For example, in a landscape layout, the arrangement of items can be a two row and four column grid. If the orientation is changed to portrait, then the arrangement will change to a four row and three column grid.

In an implementation, different screen resolutions of different mobile devices are supported by the system. Some sample screen resolutions are: 960-by-640, 1024-by-768, 1024-by-800, 1024-by-600. Other screen resolutions are possible with the system. If the application is opened on a small screen resolution, the length and width of the main section, which includes images and metadata, can be reduced while retaining its overall arrangement. For example, on a 1024-by-768 screen device in portrait orientation, the product section size can be 250 wide and 200 tall to form a four row and three column grid. On 320-by-480 device in portrait orientation, the main section size can be 100 wide and 150 tall to form a four row and three column grid.

An interactive collection book for mobile devices provides a digital representation of the collection book that can be accessed on a mobile device. Some further features of this interactive collection book include any one or combination of the following (labeled 1-18):

1. The product attributes presented in an interactive collection book for mobile devices are pulled from the information systems that manage the product attributes before the product is manufactured.

Centric Software has a product module called the Connector Hub, which has the capability to connect to third party information systems to extract or update information.

For the Collection Book, the Connector Hub can be used to automatically extract product information from information systems in order to compose an aggregate data model for a product. For example, this aggregate data model can include prices from a price book system, inventory from an inventory management system, material properties from a material management system, and sketches from a design management system. This aggregate data model can be displayed to a user though the Collection Book in order to provide the user with the most up to date information about the product that is available. Also, change management processes can be used to allow a reviewer to examine and approve the information before the information is provided to a user.

Customers can browse the most up to date product information at the time an order is placed. For example, if the development team makes a product change in an information system that increases the product price immediately before a live event, the new price will automatically be presented to the buyer when the buyer opens the collection book at the live event. In addition to price, design changes can be propagated to the selling event based on pre-defined policies that specify how such change should be synchronized relative to the buyer. For example, the company may decide to synchronize manually, or define policies to automatically update the Collection Book when simple edits occur to the design specification or when formal revision approvals are made to the specification per a formal change processes. This allows the selling company to control how last-minute changes are introduced to the Collection Book.

2. The product information presented in an interactive collection book for mobile devices can be filtered or adjusted using the location of the mobile device.

Location sensors on the mobile are used to determine the user's geographic location. The geographic location will then be sent to a server that will perform a database query in order to find events that the user is near to. If the user is near multiple events, then the user can select which event they are attending. The company that is hosting the event can add rules to the server that are attached to the event. The rules can include product visibility, product attribute visibility, and product attribute values. When the user selects the event, the rules configured by the company will be applied to the product information that is made available to the user at the event.

A company to can limit access to products or change the values of product attributes based on the event the buyer is attending. For example, a buyer attending a consumer level event, like a fashion show, will be able to access consumer level prices, and a buyer attending a corporate level event, like a show room, can access corporate level prices. Also, buyers attending a pre-release event can access information related to unreleased products, which would not be available at other events.

3. Buyers can provide product feedback though an interactive collection book for mobile devices at a live event.

The buyer can open a product detail page that provides additional information about the product. On this page, the buyer is able to enter feedback and suggestions into a comment form field. When the form is submitted to the server, the text the buyer entered into the comment field will be stored in the server and linked to the product.

Furthermore, the buyer can provide feedback using selectable input fields. For example, the buyer can indicate that they do not like the product by clicking a thumbs-down icon. Or the can indicate that they like the product by selecting a happy face icon.

Buyers can submit feedback to a company, which can be used to improve the product or to provide a custom version of the product. For example, a buyer can communicate interest in buying the product if it is provided in a color that the buyer knows sells well through the buyer's sales channels.

4. Buyers can discuss the product with each other in an interactive collection book for mobile devices using public or private comments about product. Public comments are available to all buyers, and private comments are available to a limited set of buyers. The limited set of buyers can include buyers from the same company or division in a company.

The buyer can open a product detail page that provides additional information about the product. On this page, the buyer is able to enter comments into a comment form field. Before the form is submitted to the server, the buyer can select how the system will make the comment available to others. For example, the buyer can select that the comment is private, which will make the comment on visible to the user that created the comment. The buyer can make the comment shared with other people at the same company. The buyer can select to make the comment public, which will make the comment visible to anyone who can view the product the comment is attached to.

Buyers can share observations and interest in the product with each other at a live event. Also, buyers can see which products are generating the most interest by examining the number of comments that were placed on a product. Also, companies that offer the product will have access to the comments to understand interest in the product or to identify changes to a product that will stimulate interest in the product. This information is generally not available to a company. Such collaboration can also extend to a buyer's extended team (corporate marketing team or personal social network for individual buyers) to gather and consolidate feedback to aid decision on price, style, color, aesthetics, opinion, purchase terms and the like.

5. Buyers can view the individual products and products attributes in an interactive collection book for mobile devices when multiple products are presented together at a live event.

The company sets up a product to be displayed to buyers where the product is a collection of products. The company will add related products to the primary product to allow the buyer to view the related product when viewing the details of the primary product.

Buyers can examine the details of individual products when multiple products are presented together. For example, if a model walks down a runway at a fashion show wearing a blouse, a skirt, a hat, and shoes, while carrying a handbag, the interactive collection book will display the model as the model appeared, but will also allow the user to examine the products individually together with the product attributes. So the buyer will be able to examine the total price for all the products when considered together, and the description and prices for the blouse, skirt, hat, shoes, and handbag individually.

6. The products presented in an interactive collection book for mobile devices and the presentation order of the products can be adjusted by authorized users.

A user with special access permission can open an editing view to change the products that will be presented and the order the products will be presented in. The user can make the changes, and then save the new configuration as a presentation that is available to all the users at an event.

A user from a company can adjust the products that are presented to tailor the presentation to the audience. For example, a sales representative from the company can create a presentation that only contains types of products that the representative knows a particular buyer is interested in.

7. Products can be hidden in an interactive collection book for mobile devices until the product is presented at a live event.

A rule is attached to a product that will limit access to the product until a system message is generated to show the product. The system message can be generated in automated or manual ways. For example, a user can manually click a button on an administration screen to allow the product to be accessed. Also, a rule based on time criteria can automatically generate a system message at a particular time to make the product accessible.

Companies can hide products until the products are presented. For example, if a company intends to have twenty models walk down a runway at a fashion show, the company can hide the product image and other product details until the model walks down the runway. The buyer will see a generic image place holder and will not be able to example access the product attributes until the product has been made available but by the company.

8. The order of the presentation of products at live events can be storyboarded in an interactive collection book for mobile devices before the event.

A special editing screen will be provided to allow user with special access permission to create storyboards for the presentation. These storyboards will use an image of a product or a representation of the product. Users can arrange and rearrange the images to determine the best order to present the products. Also, on each product image, users can attach notes or other product images to select the accessories and other products that will be displayed with the primary product in the presentation. These storyboards can be saved and shared with other users. As changes are made, the change history is available to all users.

The company can select the products that will be presented and create comments on the products to capture decisions or questions regarding the product. For example, if the company selects to display a group of products on a model when the model walks down the runway, the users from the company can create comments to capture decisions that include the color of the product, the color of the models hair, the height of the model, and the type of handbag the model will carry.

9. Multiple types of media can be presented for the product in an interactive collection book for mobile devices.

A user with special access permission can attach media files to the product. Media files can include videos, pictures, and songs. Theses media files will be available to users when the products are viewed in the collection book.

A company can include multiple types of media to the buyer when a product is examined in an interactive collection book for mobile devices. For example, a company can include a video of a model walking down a runway wearing the product, which will be interesting for a buyer when viewing the product after the fashion show in a different location like a boutique. Also, the company can include three-dimensional (3D) representations of the product being warn on a mannequin so that the buyer can make changes to the product to examine product options like size and color.

10. Media captured at a live event can be made available to buyers at the event through an interactive collection book for mobile devices though automated processes.

A user that creates a media file, like a picture, can upload the file to a server. A process running on the server will then attach the file to a related product using an attribute of the file to determine the right product. File attributes can include the file name or file metadata.

As media is captured at an event, the media can be automatically made available to buyers through an interactive collection book for mobile devices. For example, as a photographer takes pictures of the models as they walk down the runway, the photographer can submit the pictures to a process that will attach the picture to the product and display the picture to buyers that are using an interactive collection book for mobile devices at the event.

11. A single interactive collection book for mobile devices can be used to present products from multiple companies at a live event.

A buyer at a live event can view product offered from multiple companies in the context of the event, and the buyer can create and place orders for product from each company separately. For example, a buyer attending an event like fashion week can view all the products that are being presented at the event. The buyer can build a shopping cart for products that the buyer is interested in, and the buyer can use the shopping carts to place orders for all the products from each company.

12. Multiple levels of product attribute detail are presented to a buyer in an interactive collection book for mobile devices.

The user can start by browsing images of the products. The products are presented to the user similar to a photo gallery. When the user would like more information, they can touch a picture, and the picture will turn over to reveal the model number, a sketch, and thumbnails of the colors the product is offered in. If the user wants more information, then the user can touch a "learn more" button. New screens will appear, which display more detail for the product, including the price of the product, the material composition, the codes for the colors, the sizes available.

Further, after arriving to the end, the user can select inputs, like buttons, which will open additional screens of information for the product, than can include a user generated photo gallery, inventory estimates, construction details, artwork, package dimensions, and shipping weight.

The products and product attributes that are presented to buyers can be minimal to allow many products to be displayed at the same time, and the buyer can select to view more information about a product as needed. More information can include product attributes, comments, and images.

13. Media captured on a mobile device can be added to a product through an interactive collection book for mobile devices.

The interactive collection book for mobile devices can connect to the device storage to access media files that are on the device. Media files can include files that were created on the device using inputs like the camera, microphone, and video recorder, and can include files that the device can access including files from local storage, network storage, peer to peer storage, and cloud storage.

Any media that is captured by either the company or by buyers on the mobile device can be attached to the product to provide additional product information or to communicate feedback. For example, buyers might create videos of themselves using the product in order to provide suggestions to the company to improve the product. Also, company could create a video of an industry specialist reviewing the product in order to share the interview with potential buyers.

14. The interactive collection book for mobile devices can use sensors on the device to detect product that are near in order to make information about the product accessible to the user.

The interactive collection book for mobile devices can use sensors on the device to read product information from elements associated with a product. Device sensors can include bar code readers, RFID readers, cameras, microphones, near field sensors, and Bluetooth sensors. Elements associated to products can be attached to a product or a representation of the product like a photo or video of the product. Elements associated to products can include bar codes, text, RFID transmitters, near field transmitters, and Bluetooth transmitters. Reading information about the product can include getting product attributes like the id, getting company attributes like the contact information for the sales person, and getting shipping attributes like the package dimensions and weight.

Companies can attach elements to a product, which will make it easy for users that are near the product to get information about the product. For example, RFID transmitters can be attached to all the products that a model is wearing. When the model walks done the runway at a fashion show, the interactive collection book for mobile devices in use in the audience will be able to use the RFID sensors on the device to get the product ids for the products the model is wearing. The interactive collection book for mobile devices can then use the ids to query a server for information about the products. The information about all the products the model is wearing will then be displayed to the user on the interactive collection book for mobile devices.

15. The interactive collection book for mobile devices can be configured to adjust the appearance or functionality that is available when a user opens a particular version of the application. Configuration can include changing the appearance of the interface, limiting the products or product attributes that are displayed, or changing the functionality that is available to a user. The configured application will be distributed to users through process that include automatic updates, automated down loads, and manual downloads.

A user interface will be available to users will special access permission. A user with access to the interface can make a new application configuration, and can select configuration options and change configurable values. For example, the user can create a new configuration for a particular fashion show, like pre-fall 2011. The user can then select colors and upload images to customize the user interface to match the colors selected for the event. Then the user can select types of products that will be shown at the event, like outerwear. Then the user can select the types of users that will be using the application. The user can select that the audience will be consumer level buyers. This will hide the ability to view volume discount pricing or to place corporate level orders. When the user is done with the configuration process, the user can then select criteria for when the configuration will be made available to users as a custom application. The system will then use the configuration and availability criteria to create and distribute a custom version of the application.

Companies can create custom versions of the application, which are specially configured for events, types of buyers, or types of products, or any combination of these. This allows the company to create a unique experience in the same application.

16. A user can create a list, and store references to products in the list. Lists can include wish lists, favorites, and shopping carts. The user can submit the list of products to a company to place an order, place a pre-order, or to communicate interest in buying the product at a future date.

The user can view the details of a product, select product options, and add the product to a shopping cart. Details of the product can include price, material composition, and images. Product options can include color, size, and quantity. When the user is ready, the user can submit the shopping cart to the server to create a purchase order or pre-order.

A company can use the interactive collection book for mobile devices to receive product orders from buyers.

17. The interactive collection book for mobile devices can recommend products to the user. Recommended products can include products similar to the product the user has viewed at the current event or at previous events, products that have been viewed by users at the same company, products that have been viewed by friends or coworkers of the user, and products based on information about the user. Information about the user can include color preferences, events the user has attended, the user's body dimensions, and the users purchase history.

A service will be implemented that can provide product recommendations. The service can examine the interaction history for the user or for groups of users. Also, the service can be configured by the user to use information about the user when determining products to recommend.

The user can receive recommendations for products while at an event, which can save the user time when looking for product they would be interested in.

18. Buyer and Seller able to engage in sales negotiation relative to requested changes in selected items and corresponding design specification and price.

Buyer can submit an offer to purchase 1 or more products. The offer can include a reduced price, a particular delivery date, or a proposed quantity. The system will present the offer to the company, and a user from the company with proper access rights can select to accept the offer, propose a counter offer, or decline the offer. The system will notify the buyer of the company's response. If the company did not accept the offer, the buyer can resubmit the offer with changes or cancel the offer.

The buyer's collection is available to the seller. Buyer may include change proposals, while seller can quickly assess feasibility to quickly close transaction. For example, the seller can conduct a cost-based margin analysis against the buyer's collection to arrive at a negotiated price based on margin targets against the buyer's specific collection rather than each item.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:
1. A method comprising:
providing a mobile device and a user of the mobile device, wherein the mobile device contains at least one collection book associated with at least one designer and at least one collection with at least one item;

providing a first good and an electronically identifiable tag which uniquely identifies a model number of the good;

detecting the electronically identifiable tag via a wireless radio signal, wherein the detecting comprises translating the wireless radio signal into digital information stored on the electronically identifiable tag;

displaying a first screen on the mobile device information on the first good, wherein the information on the first good comprises metadata;

displaying a second screen on the mobile device information on the first good, wherein the second screen contains at least one piece of information more than the first screen;

displaying a third screen on the mobile device information on a collection within which the first good belongs, wherein the third screen lists a plurality of goods within the collection other than the first good;

providing a product lifecycle management system to which the mobile device can be connected;

allowing a change to be made to the at least one collection book via the product lifecycle management system, wherein the change comprises adding a new feature for the first good;

at the mobile device, synchronizing the changes made to the at least one collection book via the product lifecycle management system; and after the synchronizing, displaying on the first screen on the mobile device information on the new feature as associated with the first good.

2. The method of claim 1 comprising:
displaying a third screen on the mobile device a shopping cart.

3. The method of claim 1 wherein the mobile device detects the electronically identifiable tag wirelessly.

4. The method of claim 1 comprising:
displaying on the first screen a discussions option regarding the first good;
upon selection of the feedback option, displaying a fourth screen where the user can enter feedback information that is collected for a designer associated with the first good.

5. The method of claim 4 wherein in the fourth screen, the user can see feedback made by other users.

6. The method of claim 4 wherein in the fourth screen, the user can see a reply made by the designer to the user.

7. The method of claim 4 wherein in the fourth screen, the user can see a reply made by the designer to another user.

8. The method of claim 1 comprising:
displaying on the first screen a feedback option regarding the first good;
upon selection of the feedback option, allowing a user to enter feedback information that is collected for a designer associated with the first good.

9. The method of claim 1 comprising:
allowing a first user to make an exclusive purchase of a quantity of the first good including a first feature; and
after the exclusive purchase by the first user, disallowing a second user from making a purchase of the first good including the first feature, but allowing the second user to make a purchase of the first good including a second feature that is different from the first feature.

10. The method of claim 1 wherein the first screen displays a wholesale price and a suggested retail price for the first good.

11. The method of claim 1 wherein the first good is a first product proposal that has not yet been released to manufacturing.

12. The method of claim 11 wherein the plurality of goods in the third screen comprises a list of product prototypes that have not yet been manufactured.

13. The method of claim 1 wherein the electronically identifiable tag comprises a radio-frequency identification (RFID) tag.

14. The method of claim 1 wherein the wireless radio signal comprises near field communication (NFC).

15. A method comprising:
providing a mobile device and a user of the mobile device, wherein the mobile device contains at least one collection book associated with at least one designer and at least one collection with at least one item;

providing a first good and an electronically identifiable tag which uniquely identifies a model number of the good;

detecting the electronically identifiable tag via a wireless radio signal, wherein the detecting comprises translating the wireless radio signal into digital information stored on the electronically identifiable tag;

displaying a first screen on the mobile device information on the first good, wherein the information on the first good comprises metadata;

displaying a second screen on the mobile device information on the first good, wherein the second screen contains at least one piece of information more than the first screen;

displaying a third screen on the mobile device information on a collection within which the first good belongs, wherein the third screen lists a plurality of goods within the collection other than the first good, and the plurality of goods within the collection comprises a clothing ensemble comprising a second good;

providing a product lifecycle management system to which the mobile device can be connected;

allowing a change to be made to the at least one collection book via the product lifecycle management system, wherein the change comprises adding another item of clothing to the ensemble comprising a third good;

at the mobile device, synchronizing the changes made to the at least one collection book via the product lifecycle management system; and after the synchronizing, displaying on the third screen on the mobile device information on the collection within which the first good belongs, wherein the information comprises the clothing ensemble comprising the second good and the third good.

16. The method of claim 15 wherein the electronically identifiable tag comprises a radio-frequency identification (RFID) tag.

17. The method of claim 15 wherein the wireless radio signal comprises near field communication (NFC).

18. The method of claim 15 wherein the mobile device detects the electronically identifiable tag wirelessly.

19. The method of claim 15 comprising:
allowing a first user to make an exclusive purchase of a quantity of the first good including a first feature; and
after the exclusive purchase by the first user, disallowing a second user from making a purchase of the first good including the first feature, but allowing the second user to make a purchase of the first good including a second feature that is different from the first feature.

20. A method comprising:
providing a mobile device and a user of the mobile device, wherein the mobile device contains at least one collection book associated with at least one designer and at least one collection with at least one item;
providing a first good and an optically identifiable tag which uniquely identifies a model number of the good;
detecting the optically identifiable tag via an image capture device, wherein the detecting comprises translating an image captured by the image capture device into digital information stored on the optically identifiable tag;
displaying a first screen on the mobile device information on the first good, wherein the information on the first good comprises metadata;
displaying a second screen on the mobile device information on the first good, wherein the second screen contains at least one piece of information more than the first screen;
displaying a third screen on the mobile device information on a collection within which the first good belongs, wherein the third screen lists a plurality of goods within the collection other than the first good;
providing a product lifecycle management system to which the mobile device can be connected;
allowing a change to be made to the at least one collection book via the product lifecycle management system, wherein the change comprises adding a new feature for the first good;
at the mobile device, synchronizing the changes made to the at least one collection book via the product lifecycle management system; and
after the synchronizing, displaying on the first screen on the mobile device information on the new feature as associated with the first good.

21. The method of claim 20 wherein the optically identifiable tag comprises a barcode.

* * * * *